US011740091B2

(12) United States Patent
Buscemi

(10) Patent No.: US 11,740,091 B2
(45) Date of Patent: Aug. 29, 2023

(54) METHODS AND APPARATUS FOR DISTRIBUTING AND/OR RECEIVING LOCALLY RELEVANT INFORMATION IN EMERGENCIES

(71) Applicant: CECELUMEN, LLC, Camarillo, CA (US)

(72) Inventor: James S Buscemi, Camarillo, CA (US)

(73) Assignee: Cecelumen, LLC, Camarillo, CA (US)

( * ) Notice: Subject to any disclaimer, the term of this patent is extended or adjusted under 35 U.S.C. 154(b) by 0 days.

(21) Appl. No.: 15/062,175

(22) Filed: Mar. 6, 2016

(65) Prior Publication Data

US 2017/0131105 A1 May 11, 2017

Related U.S. Application Data

(60) Provisional application No. 62/273,820, filed on Dec. 31, 2015, provisional application No. 62/251,678, filed on Nov. 5, 2015.

(51) Int. Cl.
*G01C 21/20* (2006.01)
(52) U.S. Cl.
CPC .................. *G01C 21/206* (2013.01)
(58) Field of Classification Search
CPC ...................................... G01C 21/206
See application file for complete search history.

(56) References Cited

U.S. PATENT DOCUMENTS

| 8,831,660 B2 | 9/2014 | Jonker et al. |
| 9,898,912 B1* | 2/2018 | Jordan, II ........... H04L 12/2825 |
| 10,009,868 B1* | 6/2018 | Reyes ................ G06Q 30/0261 |
| 2006/0019679 A1 | 1/2006 | Rappaport et al. |

(Continued)

OTHER PUBLICATIONS

Notification of Transmittal of The International Search Report and The Written Opinion of The International Searching Authority or the Declaration, International Search Report and Written Opinion of the International Searching Authority from PCT/US2016/060716, dated Feb. 27, 2017 1-7 pages.

(Continued)

*Primary Examiner* — Alan D Hutchinson
(74) *Attorney, Agent, or Firm* — Straub & Straub; Michael P. Straub; Stephen T. Straub

(57) ABSTRACT

Methods and apparatus for efficiently communicating emergency management related information are described. A communications system includes a server, e.g., an emergency management server, and a plurality of beacon transmitters located at different known locations at a site of interest, e.g., a building on a college campus. An emergency management person's device sends information to the server to be communicated to one or more individuals in proximity to a beacon transmitter, with different information being communicated corresponding to different beacon transmitters. The information corresponding to a beacon transmitter includes at least one of a recommended escape route or emergency action. The server receives information including, e.g., a beacon transmitter identifier, from a user device, which is in proximity to a particular beacon transmitter. The server provides to the user device, the particular set of information corresponding to the beacon transmitter identified to be in closest proximity to the user device.

20 Claims, 25 Drawing Sheets

(56) References Cited

U.S. PATENT DOCUMENTS

| | | |
|---|---|---|
| 2006/0020684 A1 | 1/2006 | Mukherjee et al. |
| 2006/0025106 A1 | 2/2006 | Byers et al. |
| 2007/0081477 A1 | 4/2007 | Jakkahalli |
| 2008/0130595 A1 | 6/2008 | Abdel-Kader |
| 2009/0011743 A1 | 1/2009 | Johanson et al. |
| 2009/0170467 A1* | 7/2009 | Nowlan ............... H04W 4/90 455/404.1 |
| 2009/0170529 A1* | 7/2009 | Kane ............... H04W 4/024 455/456.3 |
| 2009/0279492 A1 | 11/2009 | Montemurro et al. |
| 2011/0047603 A1 | 2/2011 | Gordon et al. |
| 2011/0195687 A1* | 8/2011 | Das ............... H04W 4/024 455/404.2 |
| 2012/0116861 A1 | 5/2012 | Dobyns |
| 2013/0124309 A1 | 5/2013 | Traasdahl et al. |
| 2013/0128811 A1 | 5/2013 | Bradish et al. |
| 2014/0171039 A1 | 6/2014 | Bjontegard |
| 2014/0181245 A1 | 6/2014 | Richardson et al. |
| 2014/0194153 A1 | 7/2014 | Salkintzis |
| 2014/0236474 A1* | 8/2014 | Hansen ............... G01C 21/206 701/408 |
| 2014/0343846 A1 | 11/2014 | Goldman et al. |
| 2015/0111523 A1 | 4/2015 | South |
| 2015/0149250 A1 | 5/2015 | Fein et al. |
| 2015/0289088 A1 | 10/2015 | Terrazas |
| 2016/0370198 A1 | 12/2016 | Baughman et al. |

OTHER PUBLICATIONS

Costumed Performer, Wikipedia, Oct. 12, 2015, 3 pages, retreived from https://en.wikipedia.org/w/index.php?title=Costumer_performer&oldid=685361669.

* cited by examiner

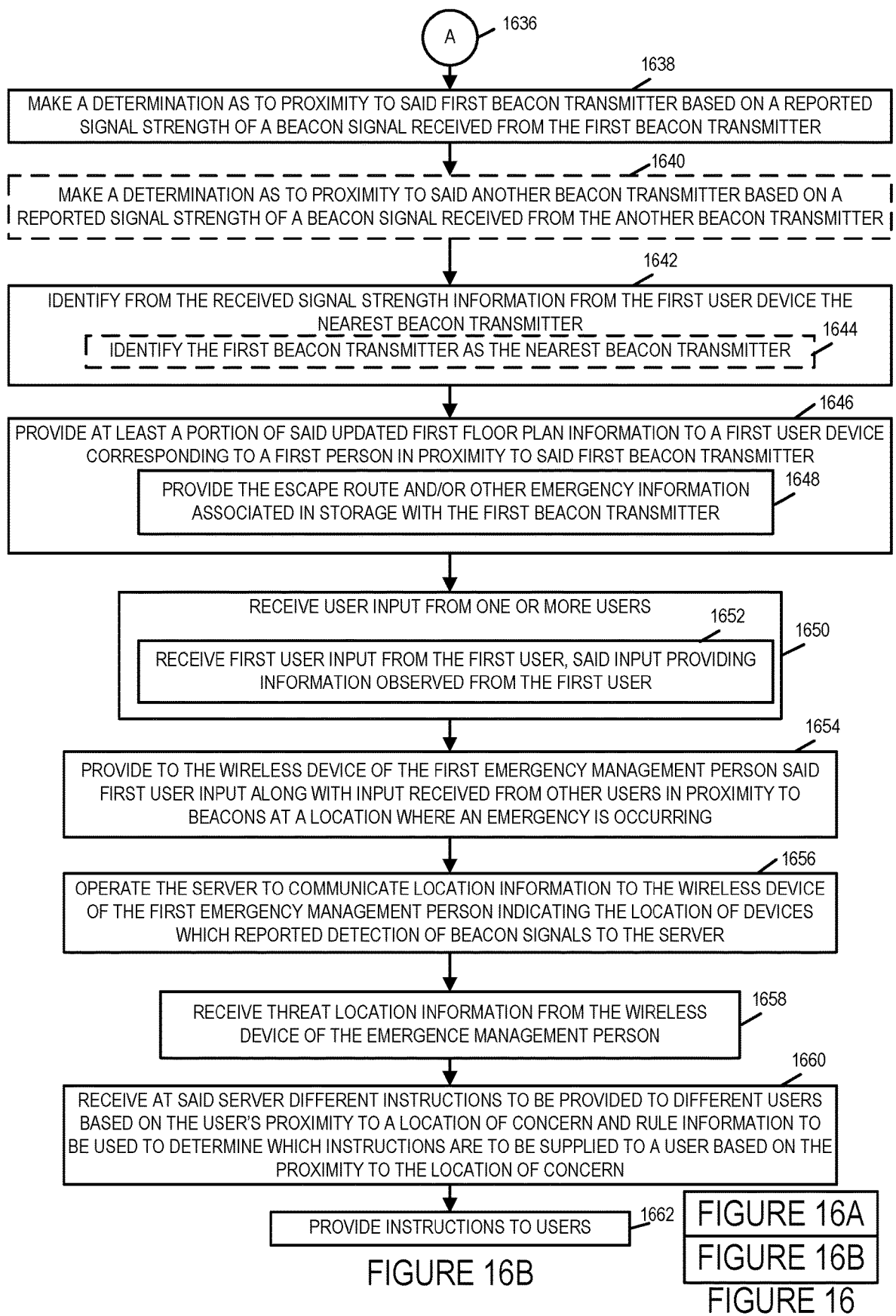

METHODS AND APPARATUS FOR DISTRIBUTING AND/OR RECEIVING LOCALLY RELEVANT INFORMATION IN EMERGENCIES

RELATED APPLICATIONS

The present application claims the benefit of U.S. Provisional Patent Application Ser. No. 62/251,678, filed on Nov. 5, 2015 and U.S. Provisional Patent Application Ser. No. 62/273,820, filed on Dec. 31, 2015 which are hereby expressly incorporated by reference in their entirety.

FIELD

The present application relates to communications systems and methods and, more particularly, systems and methods which can be used to communicate information during emergencies and/or under other circumstances.

BACKGROUND

There is a need to be able to communicate locally relevant information and/or content to users under a wide range of circumstances. In some cases the need to communicate information may take on a serious nature, such as in the case of needing to communicate information about an exit in the case of a fire or to communicate information in the event of a school shooter on campus. There is also a need to be able to collect local information. In addition it would be desirable if it would be possible to disseminate at least some information, e.g., locally relevant information, after review in a controlled manner to individuals at various locations in an area affected by an emergency.

Emergency situations present a variety of problems. In many cases individuals to whom it would be desirable to communicate locally relevant information may not know their location within a building since GPS often fails inside a building. In addition cellular communication from a cell tower located outside a building or emergency area may not be able to reach the cell phones of individuals located inside a building. Furthermore the cellular system maybe overloaded during an emergency making it difficult or impossible to communicate with cellular signals from a cellular tower located on a campus outside buildings in which individuals who are at risk maybe located.

Thus, it should be appreciated that while individual are likely to have their cell phones with them during an emergency or other situations it would be desirable if methods of using the non-cellular features of cellphones or other communications devices, e.g., WiFi or Bluetooth features, could be developed for use in emergency situations where GPS location information might not be available such as in building or might not be of sufficient accuracy to provide location information of a level of detail that might be desired for planning a path to escape an emergency such as a first or potential shooter on campus.

In view of the above, it should be appreciated that there is a need for improved methods and/or apparatus for communicating information for one or more individuals or purposes.

SUMMARY

In various embodiments, beacon transmitters are placed at various locations where people may be located, e.g., on a campus, on a ship and/or in public areas of a hotel such as in halls and lobbies. The beacon transmitters may be WiFi, Bluetooth or another type of beacon transmitter. While in some embodiments the beacon transmitters are simply transmitters which can be used to facilitate location determination and/or to receive information in some embodiments the beacon transmitters are part of a WiFi or other access point which can be used to receive information as well as transmit information.

While WiFi or other non-cellular communication is used in some embodiments, beacon transmitters may be used to provide locally relevant information while cellular communication maybe used to communication information from a user of a cell phone in range of a beacon transmitter where WiFi or non-cellular uplink communication is not readily available.

In some embodiments, floor plans of buildings and/or maps including structure and/or building location information are stored and made accessible to a server. The floor plans include the known locations of the beacon transmitters. Different beacon transmitters transmit different wireless signals, e.g., WiFi or other types of wireless signals, which can be detected by user devices. Devices can, and sometimes do, report detection of beacon signals to the server and receive associated information from the server. The information may, and sometimes does, include floor map information showing the location of the beacon transmitter from which the user device received a beacon signal and various exists available to a user given the user's proximity to the beacon transmitter from which a signal was received.

In the event of an emergency, an emergency management person, e.g., fireman, FBI agent, campus security, etc. may contact the server which is used to distribute information to devices which detect beacon signals from beacon transmitters within the area of the emergency. Thus, locally relevant information can be communicated via WiFi or other beacon signals without the need for the information to go out to each individual in the area via cellular, e.g., CDMA or GSM signals. For example, in the case of a school or college campus where a gun or other threat is considered to exist, a fireman or security person may log into the server via a wireless device used by the emergency management person, be authenticated the emergency management persons authorization level checked to determine his right to access and/or update emergency information received from users at the site of the emergency and/or post or authorize the distribution of emergency information.

Once logged in and having passed security checks, e.g., password and user ID checks, implemented by the server, the emergency management person is provided access to information supplied by people at the site of the emergency, e.g., which received a beacon signal and reported information about the conditions at their location and/or what they observed. The location from which the information was received may be displayed on a map or floor plan along with information about the wireless device and/or individual providing the information. The emergency management person thus be provided by the server with information about the number, location and status of individuals at the site of the emergency as well as reported information about a threat, e.g., intruder, fire condition or other information reported to the server by individuals in proximity to beacon transmitters at the site of the emergency and in wireless communication with the server. Contact information may also be provided, e.g., the cell phone number of the reporting individual or individuals.

Thus, by logging into the server an emergency management person is provided access not only to building location and floor plan information but also information about the locations of individuals who may need assistance.

The emergency management person can review the information provided and provide customized emergency exit information or emergency instructions for locations in proximity to different beacon transmitters. For example an emergency management person may be displaying a floor plan with beacon transmitter emergency exit locations, touch a transmitter location and trace a suggested exit path on the floor plan displayed on the touch sensitive screen of his/her wireless device to indicate a recommended exit route. The management person may also touch various locations on the floor plan and provide threat information associated with the location, e.g., reported gunman or fire. Such information is wirelessly provided to the server and associated with the beacon transmitters, e.g., the beacon transmitters selected as the starting location for various emergency routes.

User devices receiving a beacon signal contact the wireless server for information corresponding to the beacon signal or signals they received. The server provides the updated floor plan, emergency information and suggested emergency route(s) relevant to the users for the beacon transmitters they detected. In this way, individuals in a building, using their cell phones, can be provided emergency exit and/or emergency instructions relevant to their location which can be customized in real time or near real time by an emergency responder. In addition the emergency responder can be provided with live or nearly live information about individuals in a building, ship or other structure and/or on a campus, in real or near real time.

In some embodiments, the emergency responder can set rules with regard to the information or action to be suggested to a user based on his/her proximity to a particular location or beacon transmitter. For example, individuals which are within a first distance to an area of a possible shooter may be instructed to hide while individuals further away may be instructed to exist a building as soon as possible. The possible shooter location may be updated as information about the shooters location is obtained e.g., from observations by the emergency management people at the site, reports sent wirelessly from individuals in the area and/or based on other information. Accordingly, in some embodiments the emergency management person supplies not only information which can be provided wirelessly to users based on their proximity to one or more beacon transmitters but also rules as to which information is provided and when.

Given the large percentage of individuals who carry cell phones and/or other battery powered wireless device capable of detecting beacon signals, transmitting information, and display visual information such as maps and floor plans, the methods and apparatus of the present invention provide emergency responders a meaningful opportunity to distribute locally relevant information and receive locally relevant information taking into consideration the proximity of user devices to one or more beacon transmitters.

An exemplary method of providing emergency related information, in accordance with some embodiments, includes: receiving at a server first input from an emergency management person indicating a first recommended escape route or first emergency action to be taken by one or more individuals in proximity to a first beacon transmitter located at a first location on a first floor plan; updating first floor plan information to include said first recommended escape route or first emergency action; and providing at least a portion of said updated first floor plan information to a first user device corresponding to a first person in proximity to said first beacon transmitter. An exemplary server, in accordance with some embodiments, includes a processor configured to control the server to: receive at the server first input from an emergency management person indicating a first recommended escape route or first emergency action to be taken by one or more individuals in proximity to a first beacon transmitter located at a first location on a first floor plan; update first floor plan information to include said first recommended escape route or first emergency action; and provide at least a portion of said updated first floor plan information to a first user device corresponding to a first person in proximity to said first beacon transmitter.

Numerous additional features, embodiments and benefits of the various embodiments are discussed in the detailed description which follows. While various embodiments have been discussed in the summary above, it should be appreciated that not necessarily all embodiments include the same features and some of the features described above are not necessary but can be desirable in some embodiments.

BRIEF DESCRIPTION OF THE FIGURES

FIG. 16B is a second part of a flowchart of an exemplary method of providing emergency related information in accordance with various exemplary embodiments.

FIG. 16 comprises the combination of FIG. 16A and FIG. 16B.

DETAILED DESCRIPTION

Figure 1:
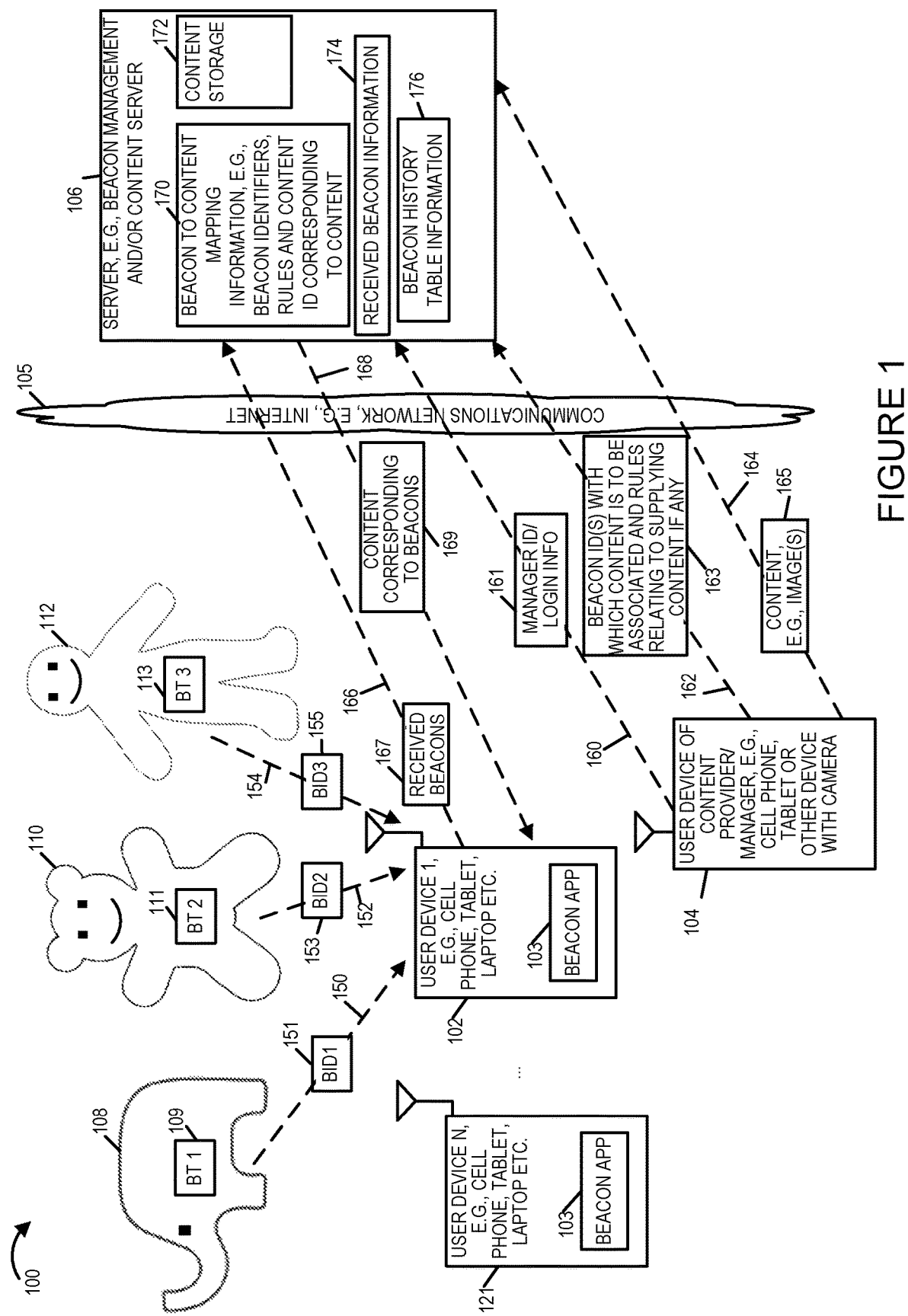
FIG. 1 illustrates an exemplary system including devices which are equipped with beacon transmitters, exemplary user devices, an exemplary user device of a content provider/manager, a communications network, and a server, e.g., a beacon management and/or content server, in accordance with an exemplary embodiment.

Methods and apparatus allow a wireless device, capable of detecting one or more signals transmitted by another device, e.g., a beacon transmitter, to detect a transmitted signal and supply content associated with the wireless signal or a set of signals to the user of a device which received the wireless signal, are described.

In one embodiment, wireless transmitters, e.g., beacon transmitters, are embedded in stuffed animals, robots, toys or other devices. Beacon transmitters may be implemented as WiFi beacon transmitters, LTE compatible transmitter devices or in another form where the beacon transmitter transmits a signal communicating information, e.g., one or more beacon identifiers, which identify the beacon signal. Different beacon transmitters may, and in some embodiments do, transmit different beacon identifiers, e.g., Beacon IDs.

In various embodiments, a content provider can detect the beacon ID transmitted by a beacon transmitter in a toy, e.g., stuffed animal or other device. The content provider may be, and in some embodiments is, a person who buys the toy, e.g., stuffed animal to give to someone else. In other embodiments, the content provider may be the toy manufacturer, a promoter associated with a promotion in which the toy is given away or some other entity who wishes to provide content under some situations to some to who the toy including the beacon is given or will come into proximity to the toy, e.g., stuffed animal including the beacon signal.

The content provider after detecting the beacon signal sends an identifier to a server, e.g., a beacon management and/or content sever, identifying the beacon. The content provider may, and sometimes does, also send content to be associated with the beacon server. The content provider can set up an account with the beacon server and login using a secure password to manage the content associated with one or more beacon identifiers. The detection of the beacon identifier and communication of content to be associated with the beacon identifier can be done using a cell phone and/or other device capable of detecting beacon signals and communicating with the content server. Images captured by a camera included in the cell phone of the content provider may, and sometimes does, provide content in the form of still images and/or video to be associated with the beacon identifier communicated to the server. In the case where the beacon identifier is known to the content provider because of information supplied with the beacon transmitter inserted into the device or toy, the content provider may enter the beacon identifier and associate content with the identifier without first having to scan the device to detect the beacon signal and identifier transmitted or otherwise communicated by the beacon signal.

The toy or other device including the beacon transmitter may be given to someone, e.g., as a gift, by the content provider. Alternatively the toy or other device may be sold to someone.

The user receiving toy, e.g., stuffed animal or device, may use his/her cell phone or another user device such as a notepad to detect one or more beacon signals. The scanning may be done by an application running on the cell phone, e.g., an application which will be referred to herein as a beacon based browser When the beacon based browser detects a beacon signal it stores the information in a beacon history log along with information about the time the beacon was detected. The user device detecting the beacon may, and in some embodiments also does contact the beacon/content server reporting detection of the beacon signal and/or other signals detected at a given time and seeking content associated with the beacon signal and/or a set of signals which were detected.

The content server checks its rules for supplying content corresponding to beacon signals and, if there is stored content corresponding to reported beacon signal or signals and the logic associated with the content indicates it should be provided to a user in response to a reported detection event, the corresponding content is supplied to the user. For example the user of a cell phone detecting a beacon signal may be provided images or video associated by a content manager with the reported beacon signal.

Thus, for example, a boyfriend may give a cute stuffed animal to his girlfriend. The boyfriend can upload pictures to the content sever and have them associated with the beacon id associated with the beacon transmitter. The girlfriend can access the pictures and/or other contact using her cell phone which detects the beacon signal transmitted by the cute stuffed animal, accesses the content server, indicates the beacon identifier and time of receipt to the content server and receives in response content the boyfriend associated with the beacon identifier. Over time the boyfriend, as the content manager, may change the content associated with the beacon identifier corresponding to the stuffed animal given to his girlfriend and as she access the content she will see the new content uploaded by her boyfriend on her cell phone. The same technique can be used to provide a grandmother or other family member provided with a stuffed animal to content uploaded by the content manager. For example a grandmother in a nursing home could be provided a stuffed animal with a beacon transmitter. The grandmother could then use a notepad running the beacon browser application easy access to image or other content managed by the gift giver. In some embodiments the browser app is built into an electronic photo display device which automatically retrieves photos and/or video content associated with beacon signals it detects. In such embodiments the person being provided the photo album need not have to execute a browser application with the application automatically being enabled and set to retrieve and display content corresponding to detected beacon signals. In such a case while multiple individuals may have an electronic photo album implemented in accordance with the invention, e.g., in a nursing or retirement home, what images are displayed will depend on what beacon transmitters, e.g., stuffed animals with embedded beacon transmitters, are placed in proximity to the photo album. Thus a person may be provided access to family photos or other content managed and supplied by another family member, friend or other content manager without having to know how to use a cell phone or other device with a beacon browser application that may need to be selected and executed by the user. In this manner one party can easily communicate photos and/or content to another person to whom a toy including a beacon transmitter is provided.

In some embodiment conditional logic may be associated with content to make content delivery contingent upon receipt of a set of beacon signals and/or other conditions such as time conditions and/or the absence of a signal.

For example, some content may be associated with a set of beacon signals so that it is provided when signals corresponding to beacon identifiers BID1 and BID2 are both received within a given detection time period. Such a user of "AND" logic can be used to support embodiments where the content to be provided is to change based on the set of beacon signals detected within a time period.

For example, some content may be provided if the first BID1 transmitted by a first stuffed animal is detected but different content may be provided if a device reports detection of a set of beacon IDs, e.g., BID1, BID2 and BID3 in a given time period. Such an approach is particularly useful in game or toy applications where toy seller may seek to encourage the purchase of multiple stuffed animals. For example if a beacon ID transmitted by a toy pony is detected a video with a single pony may be streamed from the content server to the device reporting detection of the Beacon ID corresponding to the toy pony. However, if a Beacon ID corresponding to a toy pony and a toy horse is reported to a server content provided by a content manager associated with the "AND" of the two signals may be provided instead. Such content may include a video or story about a pony and a horse going on an adventure together for example while reporting of the pony associated beacon signal alone would result in content corresponding to just a phony storing being provided reporting of the beacon id associated with the horse toy would result in a story or video corresponding to just a horse being provided. By rewarding users with more involved stories or stories corresponding to particular sets of animals corresponding to the set of stuffed toy animals a child has in his/her room or in close proximity, children and parents can be encouraged to collect the animals they want to hear stories about.

In addition, by providing content corresponding to groups of stuffed animals based on the beacon signals individual stuffed toys transmit, group play can be encouraged with children being encouraged to take different stuffed animals or toys to group play sessions to see what new games or videos they can accessed based on the group of toys taken to the play session as opposed to their individual toys.

In some embodiments a history of reported beacon signals and content provided is maintained and used in determining what content should be supplied in response to a report of received beacon signals. For example, a boy and girl may exchange stuffed animals or other gifts including beacon signals. When their cell phones and/or other devices are in proximity to the set of exchanged gifts and receive both signals they may be able to access a first set of shared content which either the boy or girl may manage. when only one signal is received, e.g., indicating the beacon transmitters are not in close proximity the boy maybe able to access only content managed by the girl who gave him the gift including the beacon signal the boy's cell phone can access while the girl can only access content managed by the boy who gave her the gift and includes the beacon signal associated with content managed by the boy.

In other variations, content supplied may depend not only on what set of beacon signals are received but what signals were received before and/or what content was previously supplied. For example sequential portions of a story may be supplied, e.g., on per day, in response to sequential accesses by a given device to the content sever reporting receipt of a particular beacon signal.

In some cases conditional logic which is based on some signals being reported but not others may be used with regard to what content is supplied. The conditional logic may further depend on history information with respect to what signal or signals were previously reported.

For example, after beacon signals corresponding to a boy and girl are reported and content provided, the same device corresponding to one of the boy and girl may be provided with a message from the other when a single one of the two beacon signals is reported after reporting detection of the two signals. For example, when a boy and girl access content within range of the respective gifts they exchanged they may be shown images or picture they previously took together. When one of them leaves the presence of the other taking the gift they received away, the beacon transmitter of only one of the gifts will be detected and a message from the other party may be displayed indicating how they miss not being with the party they just left.

FIG. 1 illustrates an exemplary system 100 includes devices (108, 110, 112), e.g., stuffed animals, which are equipped with beacon transmitters (BT 1 109, BT 2 111, BT 3 113), respectively, exemplary user devices (device 1 102, e.g., a cell phone, tablet laptop, etc. including a beacon app 103, . . . device N 121, e.g., a cell phone, tablet laptop, etc. including a beacon app 103), an exemplary user device of a content provider/manager 104, e.g., a cell phone, tablet or other device with a tablet, a communications network 105, e.g., Internet, and a server 106, e.g., a beacon management and/or content server. The devices (108, 110, 112) include battery powered beacon transmitters (109, 111, 113), which transmit beacon signals (150, 152, 154) communicating beacon IDs (BID1 151, BID2 153, BID3 155), respectively. The devices (108, 110, 112) are mobile and can be taken on trips and/or to play meetings. User devices which are content provider/manager devices, e.g., device 104, can detect the transmitted beacon signals (150, 152, 154) and can manage content, e.g., supply content to the content server to be supplied to devices reporting receipt of one or more of the beacon signals. Exemplary signal 160 communicates manager ID/Login information 161 from user device 104 to server 106 via communications network 105. Exemplary signal 162 communicates beacon information 163 including beacons ID(s) with which content is to be associated and rules relating to supplying content if any to server 106 via communications network 105. Exemplary signal 164 communicates content 165, e.g., images, corresponding to reported beacons from user device 104 to server 106 via network 105.

User devices, e.g., device 102, can be used to access content by reporting receipt of one or more beacon signals to the content sever 106 and receiving in response content determined by the rules and/or information stored in the content server that should be supplied based on the reported received beacon signals and/or what content was previously supplied or what beacon signals were previously reported as being received. Exemplary signal 166 communicates received beacon information 167, e.g., included received beacon IDs, to server 106, via network 105. Signal 168 communicates content 169 corresponding to the reported received beacon signals from server 106 to user device 102.

In various embodiments, at least one of the user devices in system 100, e.g., device 104, performs management functions with regard to beacon associated content, and some of the user devices in system 100, e.g., devices (user device 1 102, . . . , user device N 121) do not perform management functions with regard to beacon associated content.

Server 106, e.g., a beacon management and/or content server, includes beacon to content mapping information 170, e.g., beacon identifiers, rules, and content ID corresponding to content, content storage 172, received beacon information 174, and a beacon history table 176. Beacon to content mapping information 174 includes, e.g., information 162 and/or is based on information 162. Content storage 172 includes, e.g., content 165. Received beacon information 174 includes, e.g., information 167.

Figure 2:
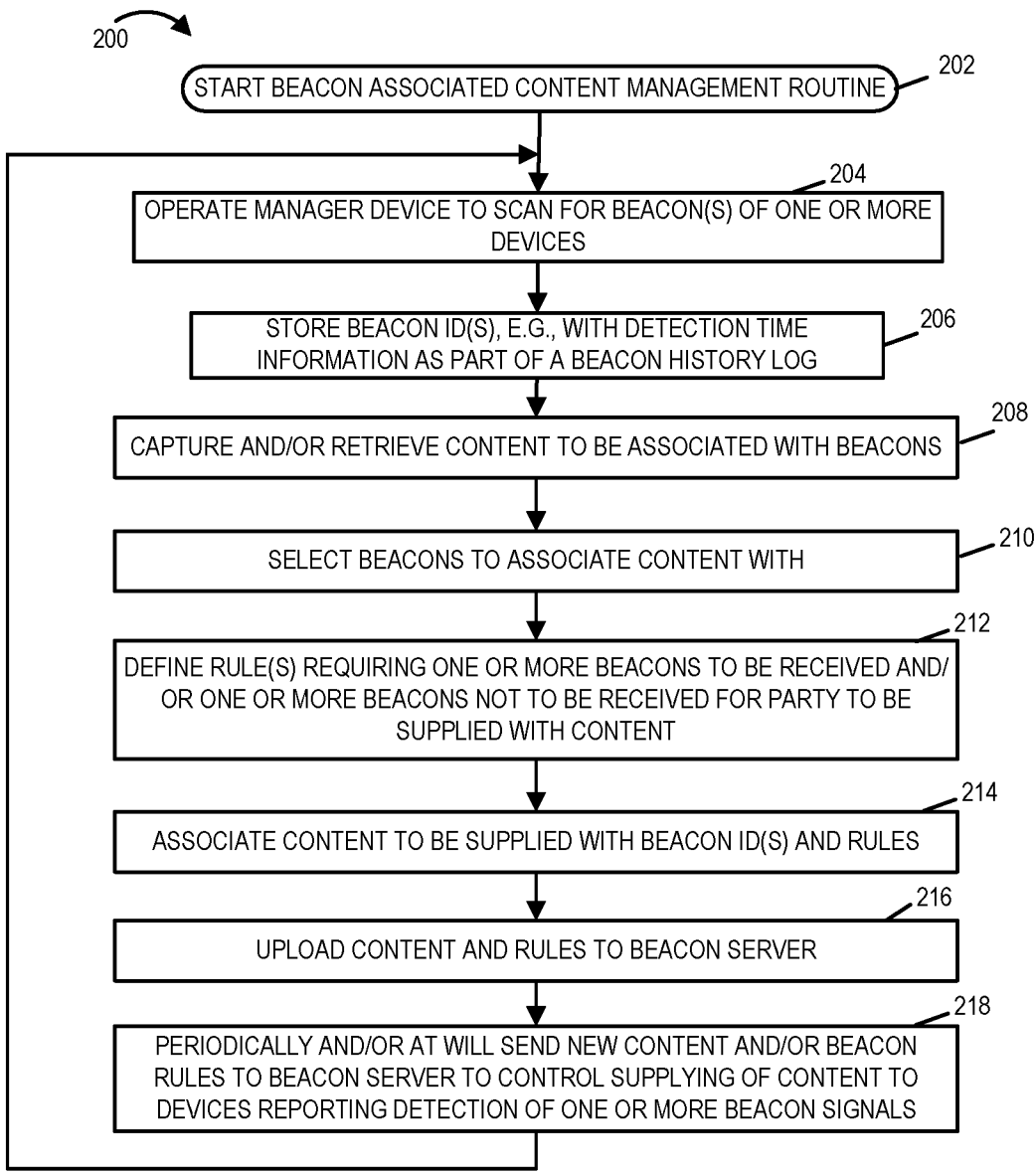
FIG. 2 is a flowchart of an exemplary method of operating a manager device, e.g., a user device of content provider/manager, in accordance with an exemplary embodiment.

FIG. 2 is a flowchart 200 of an exemplary method of operating a manager device, e.g., user device 104 of content provider/manager, in accordance with an exemplary embodiment. Operation starts in step 202 in which the manager device is powered on and initialized and a beacon associated content management routine is started. Operation proceeds from step 202 to step 204.

In step 204 the manager device is operated to scan for beacon(s) of one or more devices. The manager device may, and sometimes does, detect beacon(s) and recovers the information included in the beacon(s), e.g., including beacon ID information. Operation proceeds from step 204 to step 206.

In step 206, the manager device stores beacon ID(s), e.g., with detection time information as part of a beacon history log. Operation proceeds from step 206 to step 208.

In step 208 the manager device captures and/or retrieves content to be associated with beacons. Operation proceeds from step 208 to step 210. In step 210 the manger device selects beacons to associate content with. Operation proceeds from step 210 to step 212.

In step 212 the manager device defines rule(s) requiring one or more beacons to be received and/or one or more beacons not to be received for the party to be supplied with content. Operation proceeds from step 212 to step 214. In step 214 the manager device associates content to be supplied with beacon ID(s) and rules. Operation proceeds from step 214 to step 216. In step 216 the manger device uploads content and rules to a beacon server. Operation proceeds from step 216 to step 218. In step 218 the manager device periodically and/or at will sends new content and/or beacon rules to the beacon server to control supplying of content to devices reporting detection of one or more beacon signals.

Figure 3:
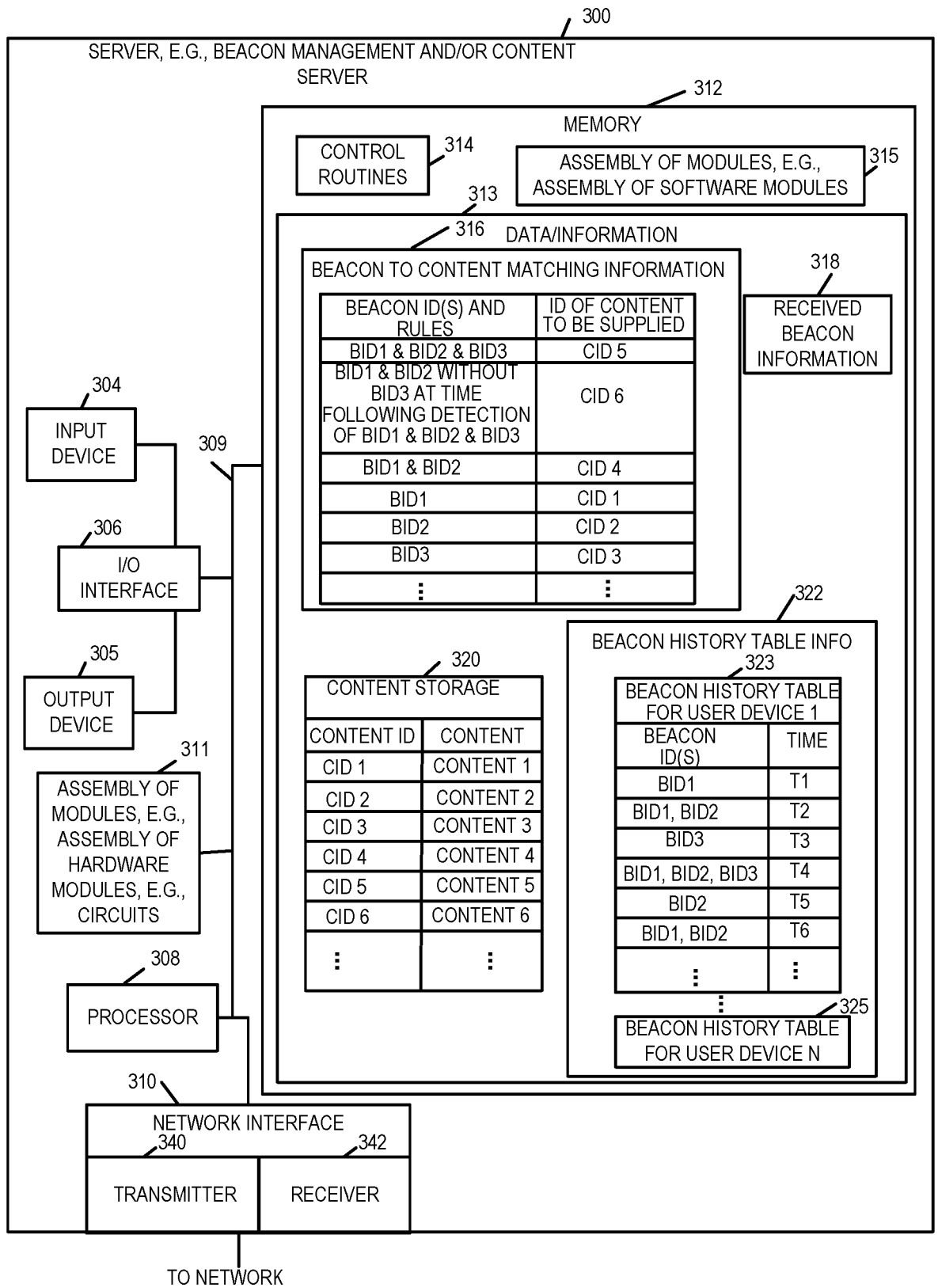
FIG. 3 is drawing of an exemplary server, e.g., a beacon management and/or content server, in accordance with an exemplary embodiment.

FIG. 3 is drawing of an exemplary server 300, e.g., a beacon management and/or content server, in accordance with an exemplary embodiment. Exemplary server 300 includes an input device 304, e.g., a keyboard, mouse, etc., an output device 305, e.g., a display, an I/O interface 306, a processor 308, e.g., a CPU, a network interface 310, an assembly of modules 311, e.g., an assembly of hardware modules, e.g., circuits, a memory 312 and a bus 309. The input device 304 and output device 305 are coupled to the bus 309 via interface 306. The I/O interface 306, assembly of modules 311, processor 308, network interface 310 and memory 312 are coupled together via bus 309 over which the various elements may interchange data and information.

Network interface 310 includes a transmitter 340 and a receiver 342. The network interface couples the server 300 to a communications network, e.g., network 105, via which the server may communicate with user devices (102, . . . , 121, 104). Memory 312 includes control routines 314, an assembly of modules 315, e.g., an assembly of software modules, and data/information 313. Data/information 313 includes beacon to content matching information 316, received beacon information 318, content storage 320 and beacon history information 322.

Beacon to content matching information 316 includes: (i) beacon ID(s) and rules and (ii) corresponding ID of content to be supplied. Various examples will not be described regarding exemplary stored beacon to content matching information. If BID1, BID2 and BID3 are reported to have been received by a user device, then content corresponding to content ID=CID 5 is to be supplied to the user device. If BID 1 and BID 2 are reported to have been received without BID 3 at a time following detection of BID 1, BID 2 and BID 3, then content corresponding to content CID=6 is to be supplied to the user device. If BID and BID 2 without BID 3 are reported to have been received by a user device and it was not at a time following detection of BID 1, BID 2 and BID 3, then content corresponding to content CID=4 is to be supplied to the user device. If only BID 1 is reported to have been received then content corresponding to content CID=1 is to be supplied to the user device. If only BID 2 is reported to have been received then content corresponding to content CID=2 is to be supplied to the user device. If only BID 3 is reported to have been received then content corresponding to content CID=3 is to be supplied to the user device.

Content storage 320 includes content IDs and corresponding stored content for each content ID. For example, content ID=CID 1 corresponds to content 1; content ID=CID 2 corresponds to content 2; content ID=CID 3 corresponds to content 3; content ID=CID 4 corresponds to content 4; content ID=CID 5 corresponds to content 5.

Beacon history table information 322 includes a beacon history table for each of a plurality of user devices (beacon history table for user device 1 323, . . . , beacon history table for user device N 325). Beacon history table for user device 1 233 includes reported beacon ID(s) detected by user device 1 and corresponding detection times. For example, exemplary information 323 indicates that user device 1 detected: beacon ID(s)={BID 1} at T1; beacon ID(s)= {BID1, BID 2} at time T2; beacon ID(s)={BID 3} at time T3; beacon ID(s)={BID 1, BID 2, BID 3} at time T4; beacon ID(s)={BID 2} at time T5; and beacon ID(s)={BID 1, BID 2} at time T6.

In response to the BID 1 detection at T1 by user device 1, the server 300, in accordance with the beacon to content matching information 316 and stored content 320, supplied content 1 to user device 1. In response to the BID 1 and BID 2 detection at T2 by user device 1, the server 300, in accordance with the beacon to content matching information 316 and stored content 320, supplied content 4 to user device 1. In response to the BID 3 detection at T3 by user device 1, the server 300, in accordance with the beacon to content matching information 316 and stored content 320, supplied content 3 to user device 1. In response to the BID 1, BID 2 and BID 3 detection at T4 by user device 1, the server 300, in accordance with the beacon to content matching information 316 and stored content 320, supplied content 5 to user device 1. In response to the BID 2 detection at T5 by user device 1, the server 300, in accordance with the beacon to content matching information 316 and stored content 320, supplied content 2 to user device 1. In response to the BID 1 and BID 2 detection at T6 by user device 1, the server 300, in accordance with the beacon to content matching information 316 and stored content 320, supplied content 6 to user device 1.

In one exemplary embodiment server 300 is server 106; beacon content to mapping information 316 is beacon to content mapping information 170; content storage 320 is content storage 172; received beacon information 318 is received beacon information 174; and beacon history table information 322 is beacon history table information 176 of system 100 of FIG. 1.

Figure 4:
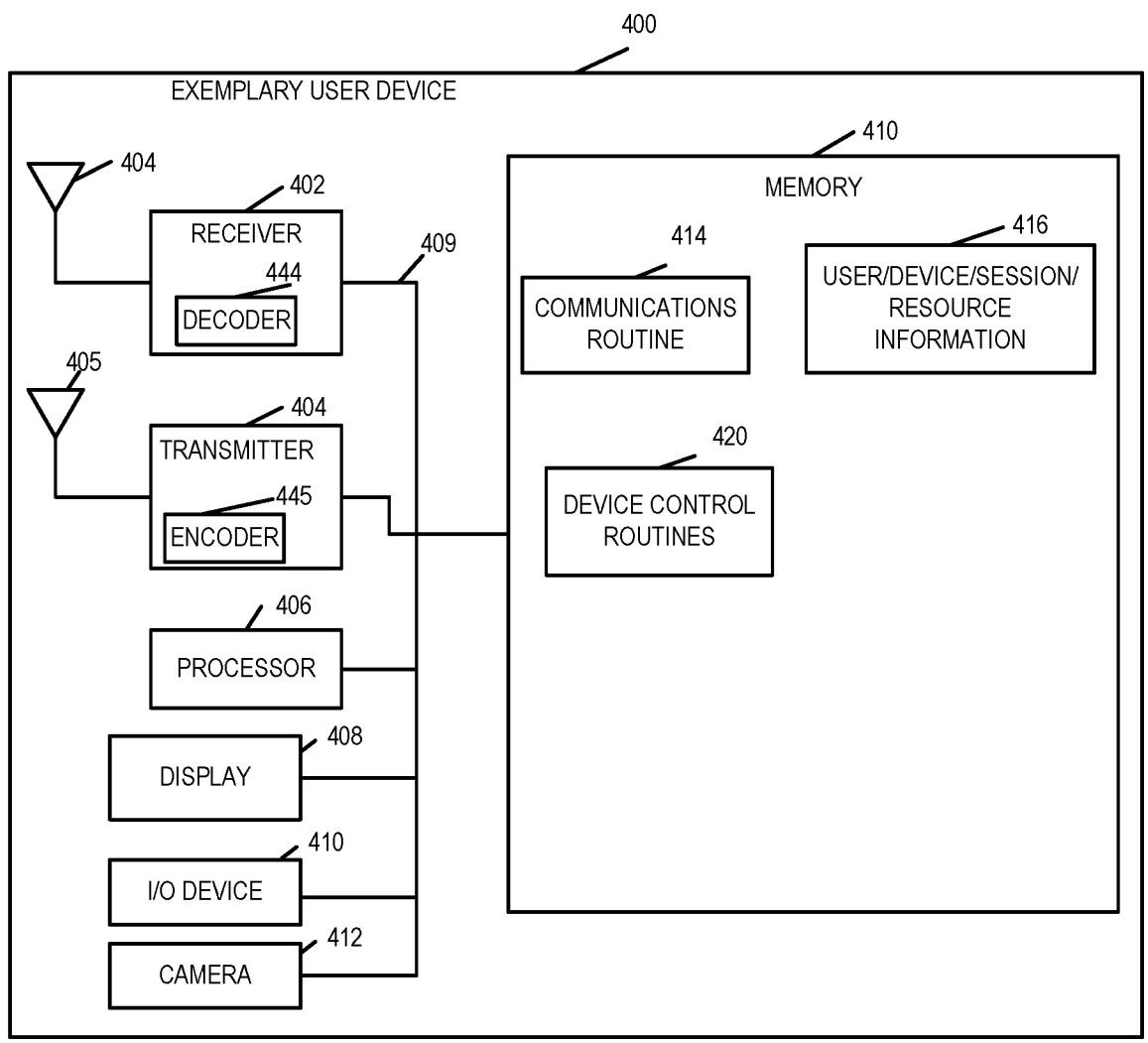
FIG. 4 is an exemplary user device, e.g., a user device of an end user of managed content, in accordance with an exemplary embodiment.

FIG. 4 is an exemplary user device 400, e.g., user device 1 102, in accordance with an exemplary embodiment. Exemplary user device 400 includes a wireless receiver 402, a wireless transmitter 404, a processor 406, e.g., a CPU, a display 408, an I/O device 410, a camera 412, and memory 410 coupled together via a bus 409 over which the various elements may interchange data and information. Wireless receiver 402 is coupled to a receive antenna 403 via which the user device may receive beacon signals, e.g., from beacon transmitters. Receiver 402 includes a decoder 444 for decoding received signals and recovering information. Receiver 402 also receives signals communicated from a server, e.g., via a base station in a communications network. Signals from the server include, e.g., content corresponding to a previously communicated set of detected beacons in accordance with content delivery rules. Wireless transmitter 404 is coupled to a transmit antenna 405 via which the user device may transmit signals to a server, e.g., indirectly via a base station in a communications network. Signals being communicated to the server include, e.g., information identifying a detected set of beacon signals, e.g., a set of detected beacon IDs, and a corresponding time.

Memory 410 includes a communications routine 414, device control routines 420 and user/device/session/resource information 416.

Figure 5:
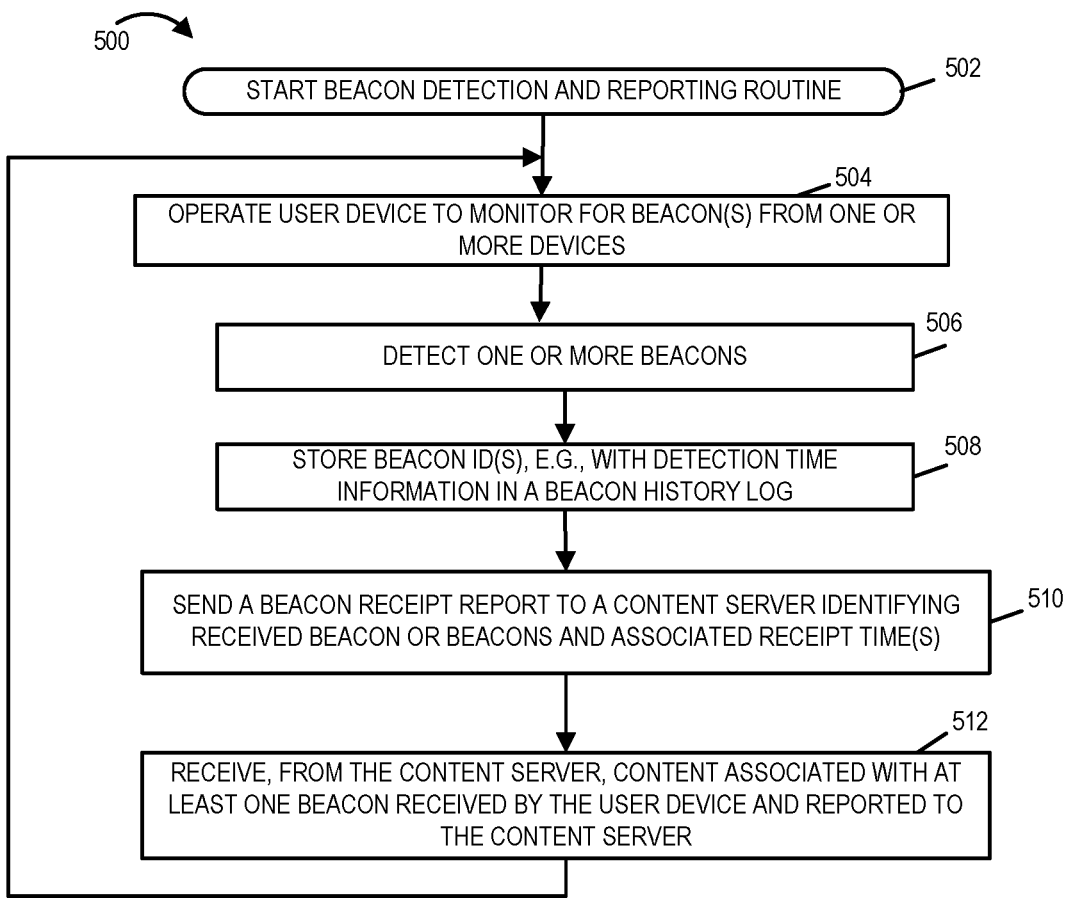
FIG. 5 is a flowchart of an exemplary method of operating a user device in accordance with an exemplary embodiment.

FIG. 5 is a flowchart of an exemplary method of operating a user device, e.g., user device 400, in accordance with an exemplary embodiment. Operation starts in step 502 in which the user device is powered on and initialized and the user device starts a beacon detection and reporting routine. Operation proceeds from step 502 to step 504, in which the user device monitors for beacon(s) from one or more devices. Operation proceeds from step 504 to step 506, in which the user device detects one or more beacons. Operation proceeds from step 506 to step 508. In step 508 the user device stores beacon ID(s), e.g., with detection time information in a beacon history log. Operation proceeds from step 508 to step 510, in which the user device sends a beacon receipt report to a content server identifying received beacon or beacons and associated receipt time(s). Operation proceeds from step 510 to step 512 in which the user device receives, from the content server, content associated with at least one beacon received by the user device and reported to the content server.

In one example, the user device implementing the method of flowchart 500 of FIG. 5 is user device 102, the server is server 106, and the detected beacons were transmitted by one or more or all of beacon transmitters (109, 111, 113).

The content management and communication techniques described with regard to supplying images and/or video can also be used to supply emergency information. For example cruise ship exit information may be provided in the event of an accident or a fire, with users in proximity to different beacon transmitters being provided with different customized information. The information may include information about the fire or accident and an exit path.

Similarly, in an on-campus emergency, such as a shooter incident, users can be provided with exit and/or other emergency response instructions customized for the location of the beacon transmitter in which they are in close proximity. FIG. 6-15 show various emergency related screens a user may be provided with and/or an emergency responder may access and configure to provide users information relevant to the location in which they detect a beacon signal.

Figure 6:
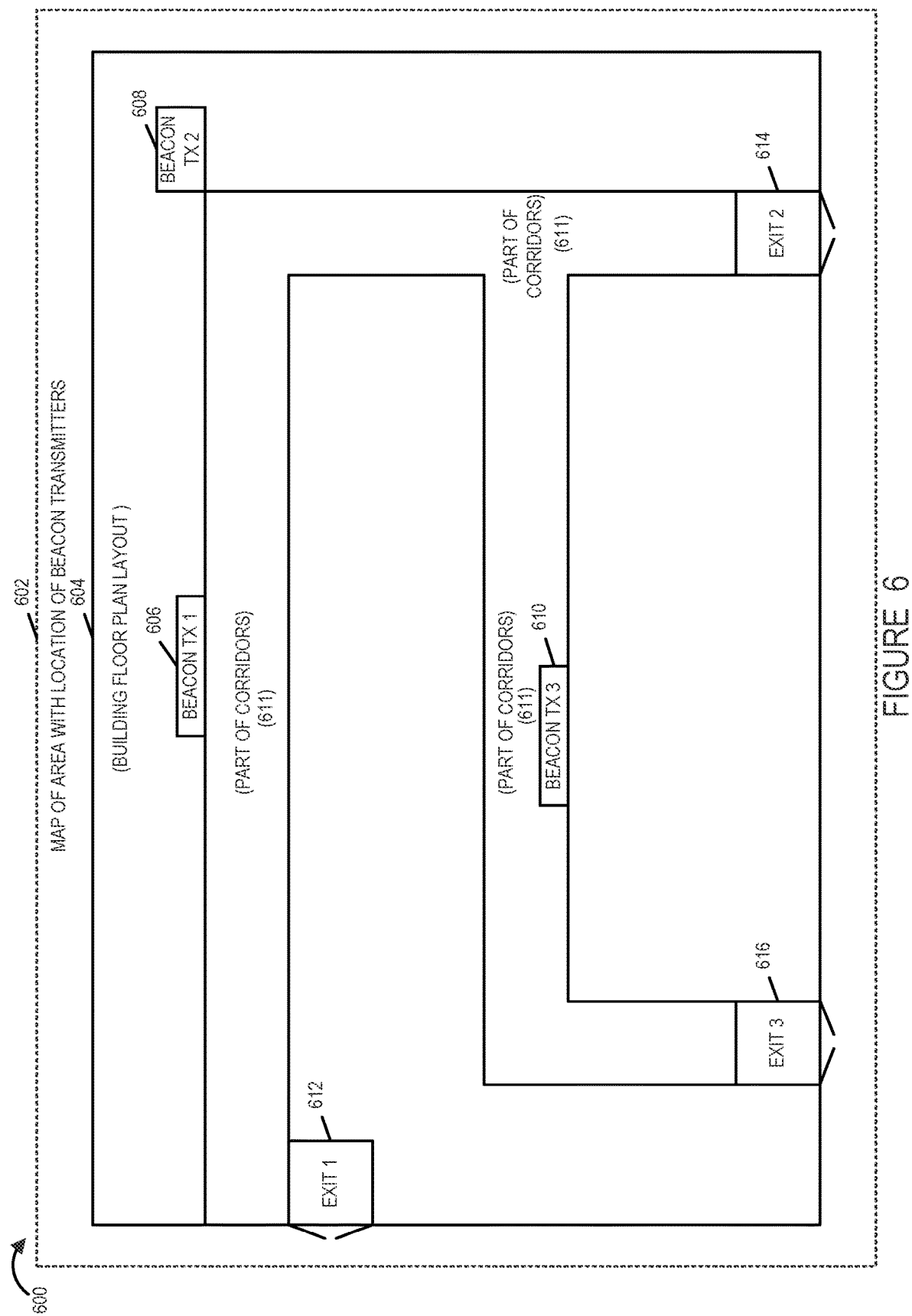
FIG. 6 is a drawing showing a map of an area with the location of beacon transmitters in accordance with an exemplary embodiment.

FIG. 6 is a drawing 600 showing a map 602 of an area with the location of beacon transmitters. Map 602 includes a building floor plan layout 604 including beacon transmitters (beacon transmitter 1 606, beacon transmitter 2 608, beacon transmitter 3 610, corridors 611, and exits (exit 1 612, exit 2 614, exit 3 616).

Figure 7:
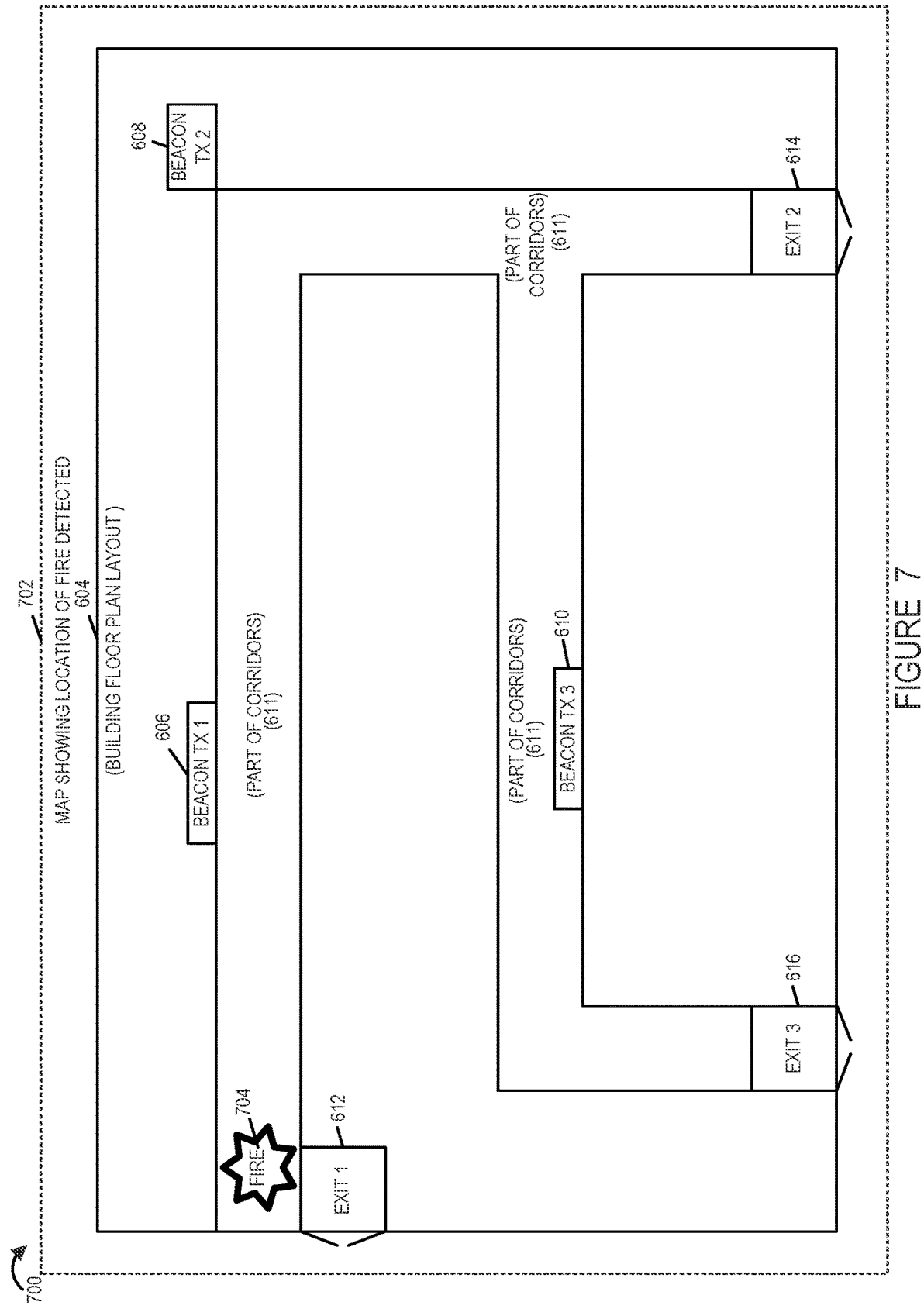
FIG. 7 is a drawing showing a map indicating the location of a detected fire in accordance with an exemplary embodiment.

FIG. 7 is a drawing 700 showing a map 702 indicating the location of a detected fire. Map 702 includes the building floor plan layout 604 including beacon transmitters (beacon transmitter 1 606, beacon transmitter 2 608, beacon transmitter 3 610, corridors 611, and exits (exit 1 612, exit 2 614, exit 3 616) and further includes star symbol 704 identifying the location of the detected fire.

Figure 8:
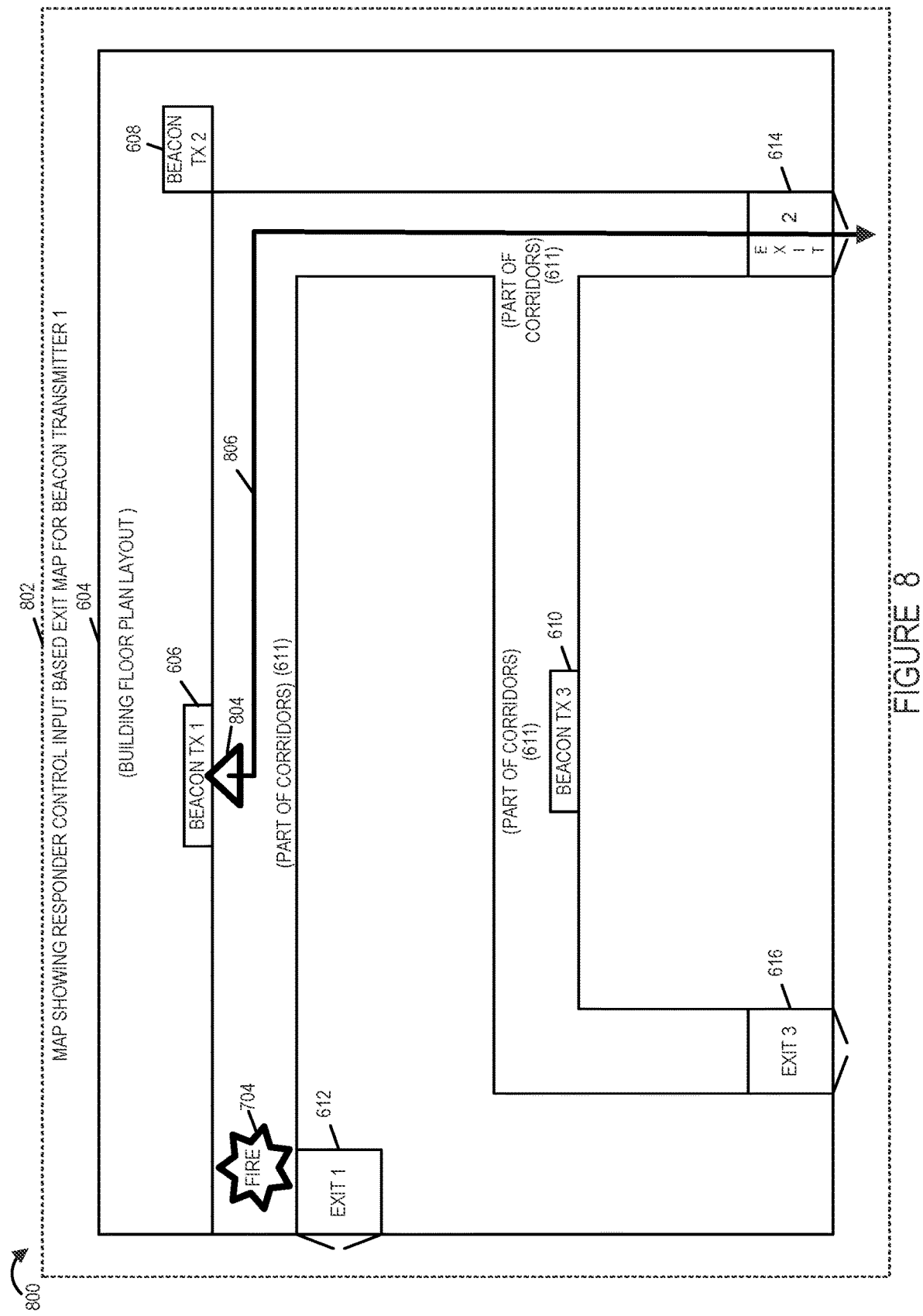
FIG. 8 is a drawing showing a responder control user input based exit map for a first beacon transmitter beacon transmitter in accordance with an exemplary embodiment.

FIG. 8 is a drawing 800 showing a responder control user input based exit map 802 for beacon transmitter 1 606. Map 802 includes the building floor plan layout 604 including beacon transmitters (beacon transmitter 1 606, beacon transmitter 2 608, beacon transmitter 3 610, corridors 611, and exits (exit 1 612, exit 2 614, exit 3 616), the star symbol 704 identifying the location of the detected fire, a triangle symbol 804 indicating the location of the beacon transmitter 1 606, and an arrow 806 indicating the responder recommended exit path from beacon transmitter 1 606 to the outsider of the building. In this example the exit path passes through building exit 2 614.

Figure 9:
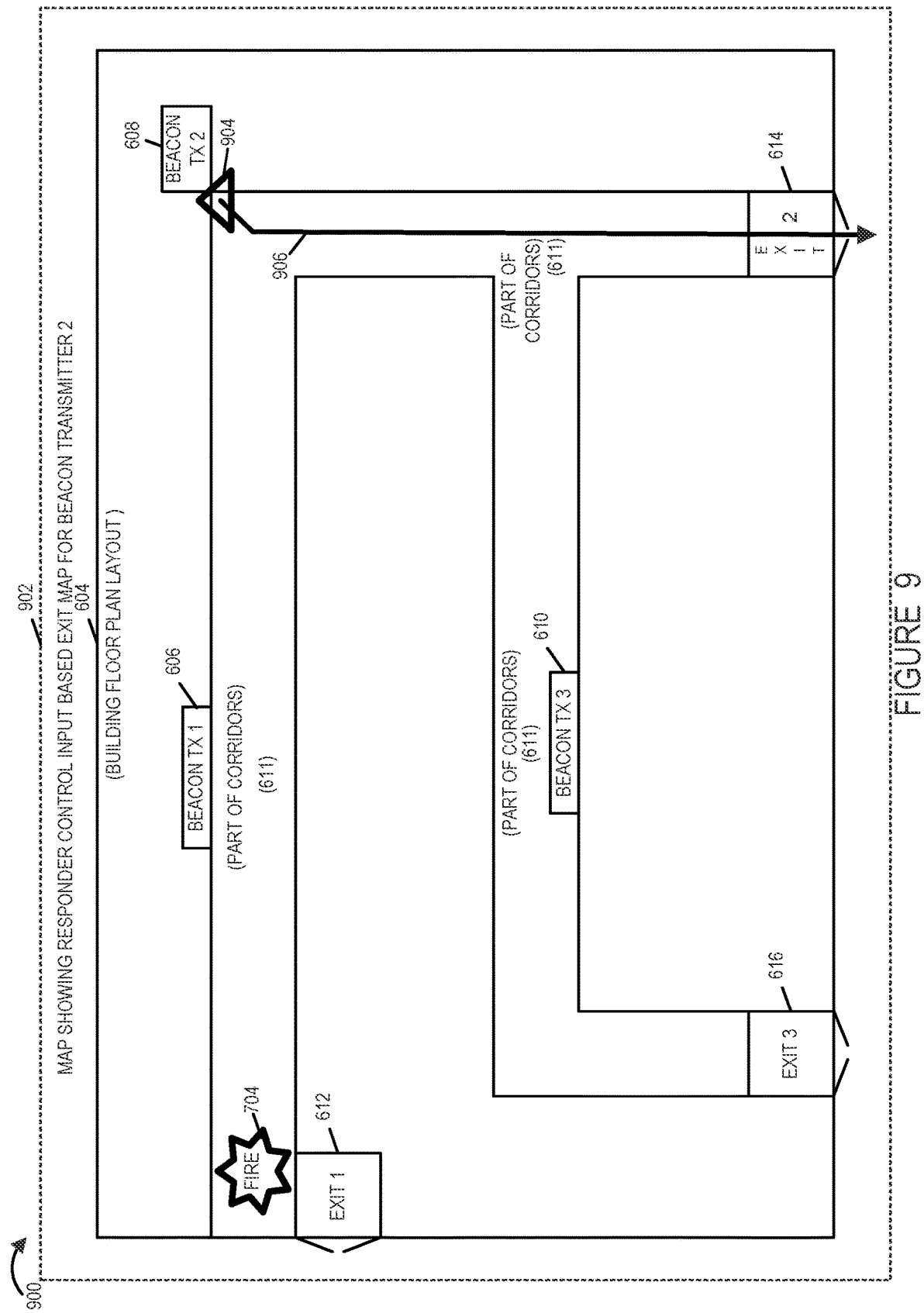
FIG. 9 is a drawing showing a responder control user input based exit map for a second beacon transmitter in accordance with an exemplary embodiment.

FIG. 9 is a drawing 900 showing a responder control user input based exit map 902 for beacon transmitter 2 608. Map 902 includes the building floor plan layout 604 including beacon transmitters (beacon transmitter 1 606, beacon transmitter 2 608, beacon transmitter 3 610, corridors 611, and exits (exit 1 612, exit 2 614, exit 3 616), the star symbol 704 identifying the location of the detected fire, a triangle symbol 904 indicating the location of the beacon transmitter 2 608, and an arrow 906 indicating the responder recommended exit path from beacon transmitter 2 608 to the outsider of the building. In this example the exit path passes through building exit 2 614.

Figure 10:
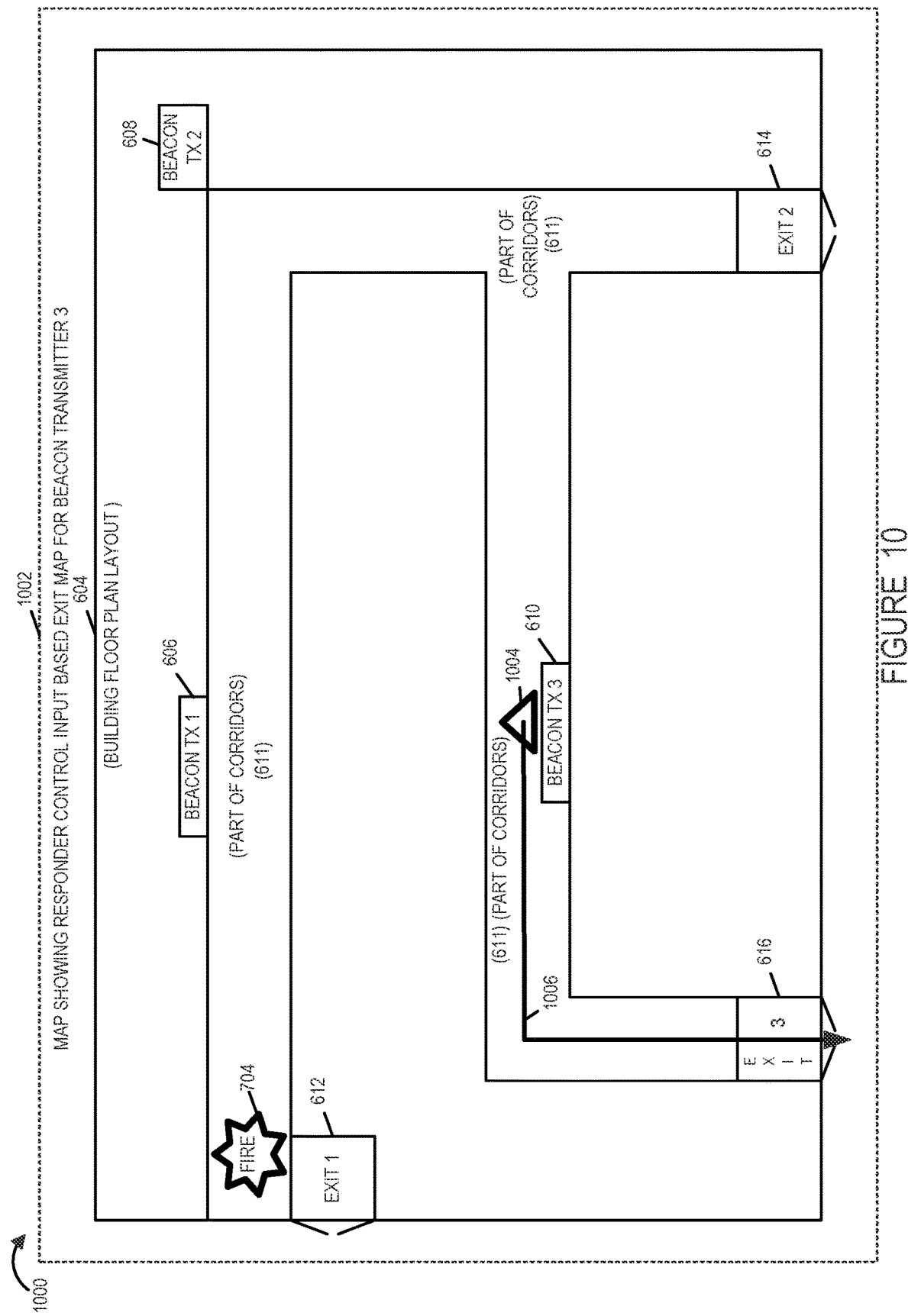
FIG. 10 is a drawing showing a responder control user input based exit map for a third beacon transmitter in accordance with an exemplary embodiment.

FIG. 10 is a drawing 1000 showing a responder control user input based exit map 1002 for beacon transmitter 3 610. Map 1002 includes the building floor plan layout 604 including beacon transmitters (beacon transmitter 1 606, beacon transmitter 2 608, beacon transmitter 3 610, corridors 611, and exits (exit 1 612, exit 2 614, exit 3 616), the star symbol 704 identifying the location of the detected fire, a triangle symbol 1004 indicating the location of the beacon transmitter 3 610, and an arrow 1006 indicating the responder recommended exit path from beacon transmitter 3 610 to the outsider of the building. In this example the exit path passes through building exit 3 616.

Figure 11:
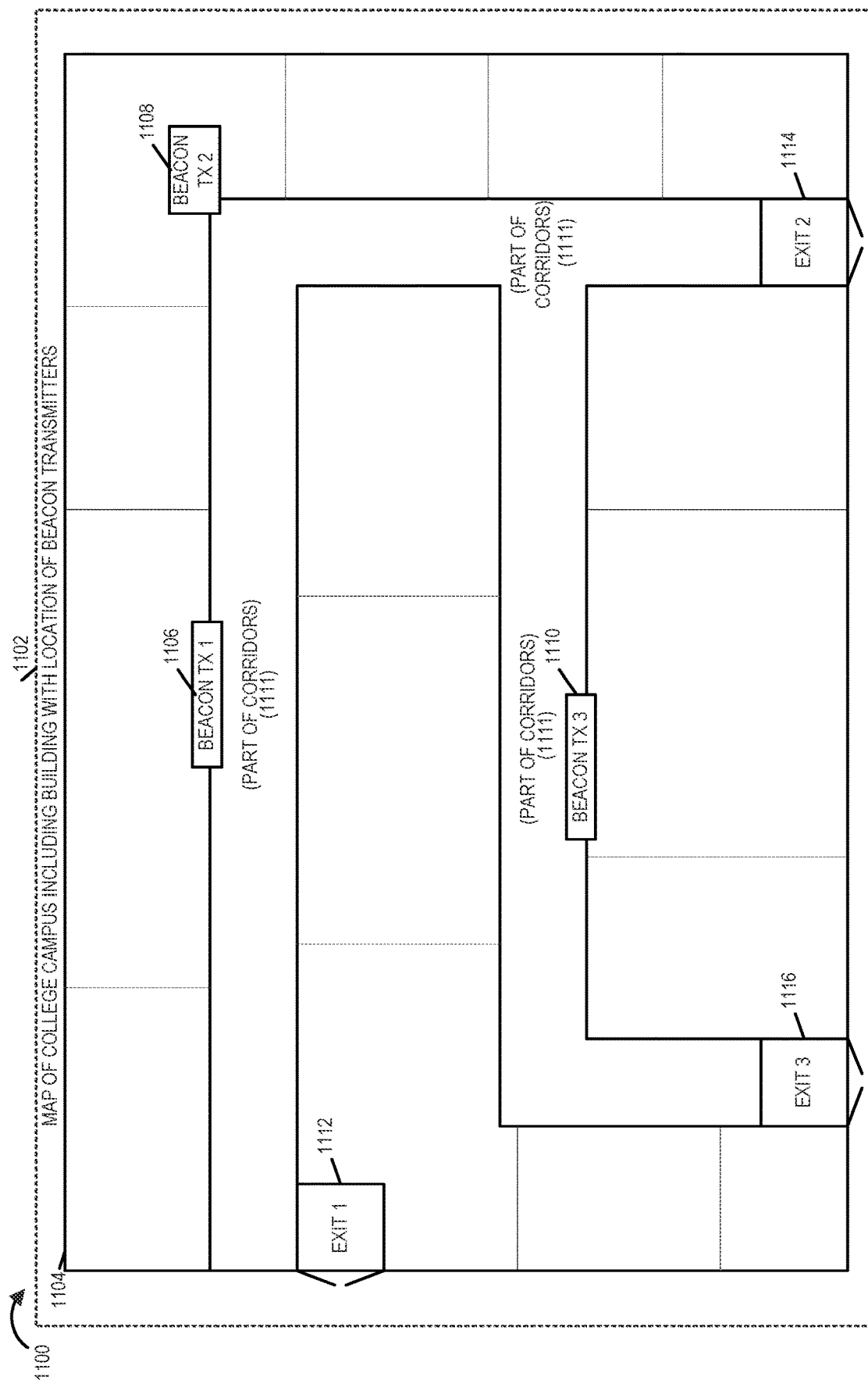
FIG. 11 is a drawing showing a map of a college campus including a building with the location of beacon transmitters in accordance with an exemplary embodiment.

FIG. 11 is a drawing 1100 showing a map 1102 of a college campus including a building with the location of beacon transmitters. Map 1102 includes a building floor plan layout 1104 including beacon transmitters (beacon transmitter 1 1106, beacon transmitter 2 1108, beacon transmitter 3 1110, corridors 1111, and exits (exit 1 1112, exit 2 1114, exit 3 1116).

Figure 12:
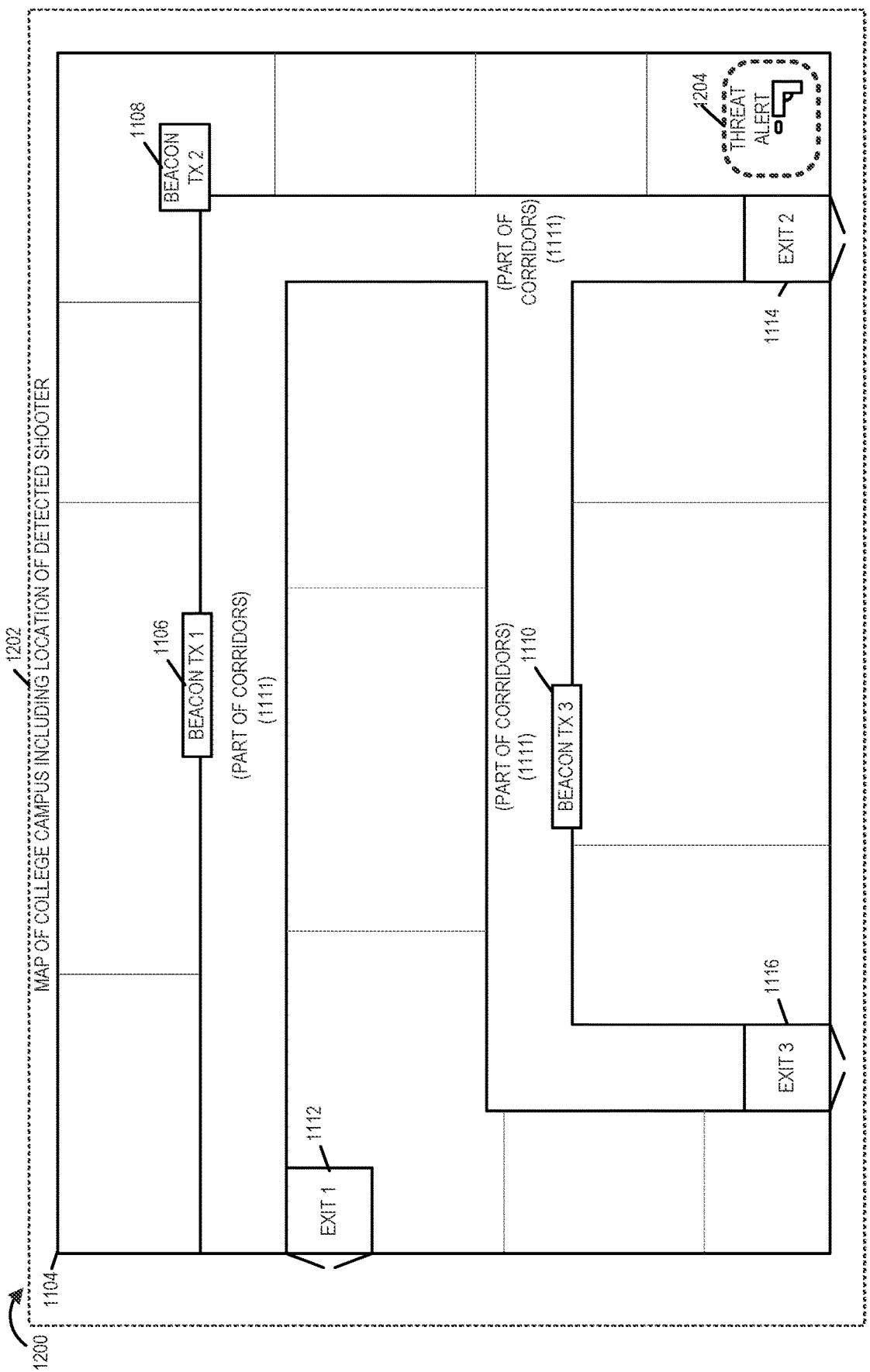
FIG. 12 is a drawing showing a map indicating the location of a detected threat, e.g., a detected shooter, in accordance with an exemplary embodiment.

FIG. 12 is a drawing 1200 showing a map 1202 indicating the location of a detected shooter. Map 1202 includes the building floor plan layout 1104 including beacon transmitters (beacon transmitter 1 1106, beacon transmitter 2 1108, beacon transmitter 3 1110, corridors 1111, and exits (exit 1 1112, exit 2 1114, exit 3 1116) and further includes a threat alert symbol 1204 including a gun identifying the location of the detected shooter.

Figure 13:
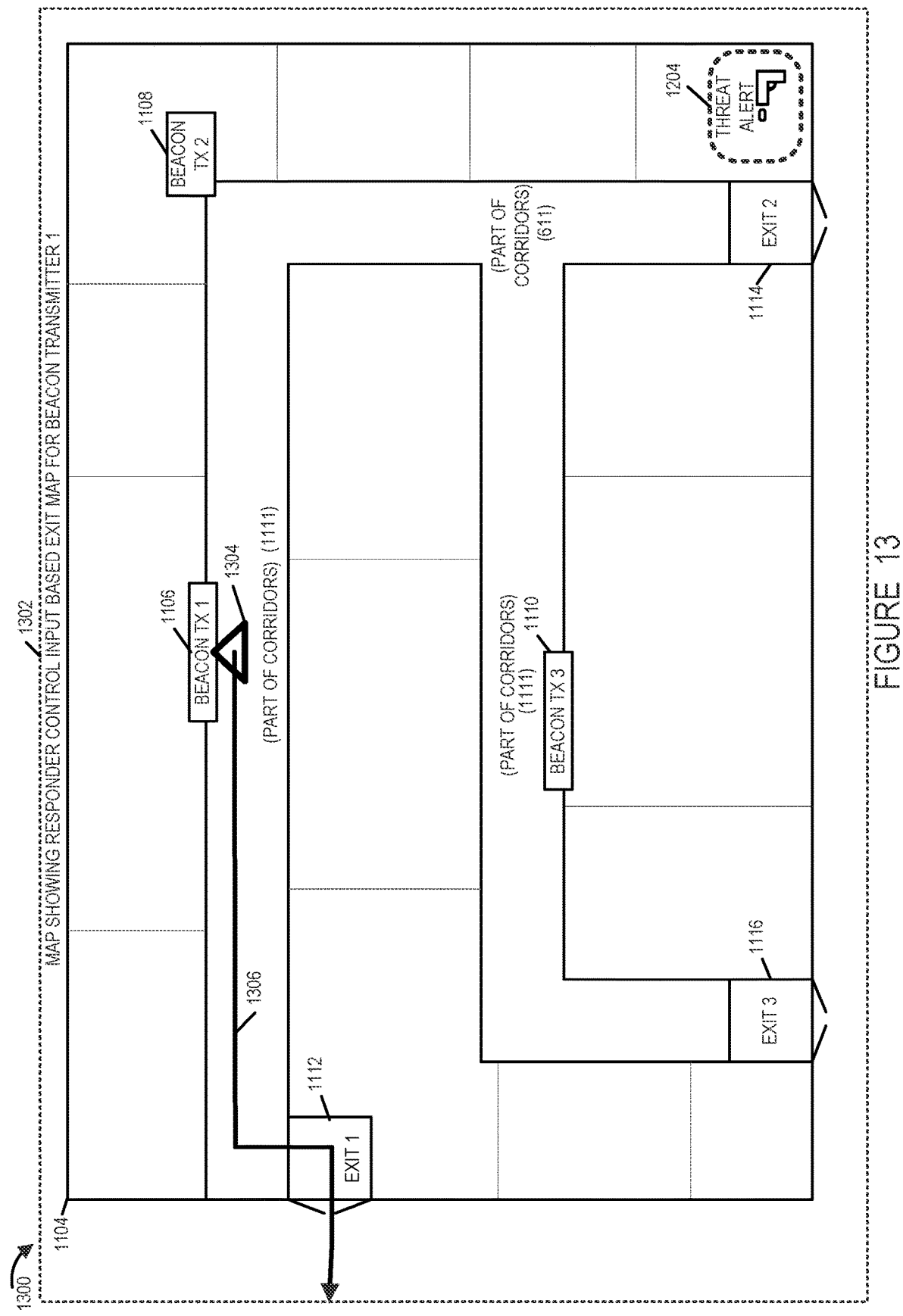
FIG. 13 is a drawing showing a responder control user input based exit map for a first beacon transmitter in accordance with an exemplary embodiment.

FIG. 13 is a drawing 1300 showing a responder control user input based exit map 1302 for beacon transmitter 1 1106. Map 1302 includes the building floor plan layout 1104 including beacon transmitters (beacon transmitter 1 1106, beacon transmitter 2 1108, beacon transmitter 3 1110, corridors 1111, and exits (exit 1 1112, exit 2 1114, exit 3 1116), the threat alert symbol 1104 identifying the location of the detected threat, a triangle symbol 1306 indicating the location of the beacon transmitter 1 1106, and an arrow 1306 indicating the responder recommended exit path from beacon transmitter 1 1306 to the outsider of the building. In this example the exit path passes through building exit 1 1112.

Figure 14:
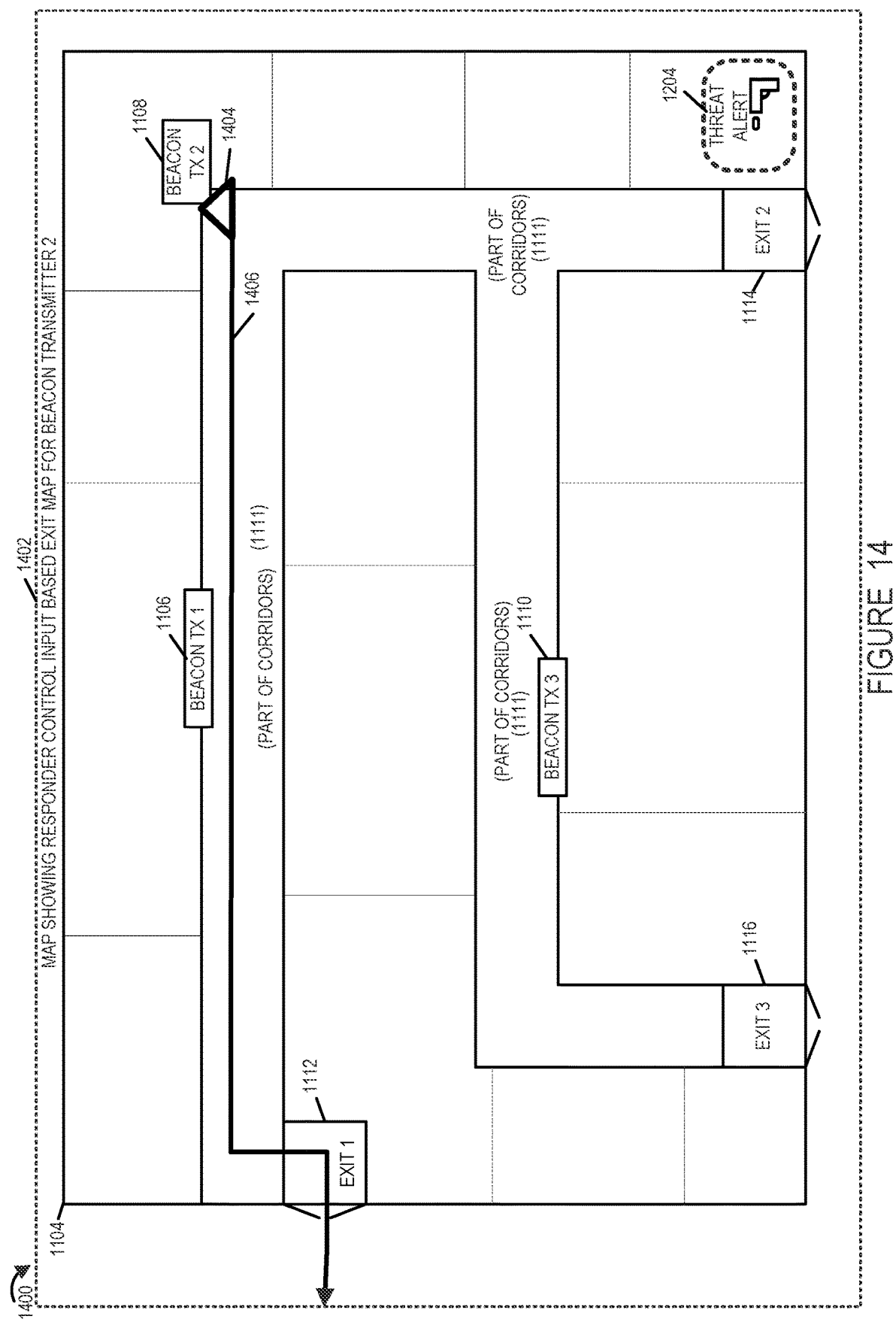
FIG. 14 is a drawing showing a responder control user input based exit map for a second beacon transmitter in accordance with an exemplary embodiment.

FIG. 14 is a drawing 1400 showing a responder control user input based exit map 1402 for beacon transmitter 2 1408. Map 1402 includes the building floor plan layout 1104 including beacon transmitters (beacon transmitter 1 1106, beacon transmitter 2 1108, beacon transmitter 3 1110, corridors 1111, and exits (exit 1 1112, exit 2 1114, exit 3 1116), the threat alert symbol 1204 identifying the location of the detected threat, a triangle symbol 1404 indicating the location of the beacon transmitter 2 1108, and an arrow 1406 indicating the responder recommended exit path from beacon transmitter 2 1108 to the outsider of the building. In this example the exit path passes through building exit 1 1112.

Figure 15:
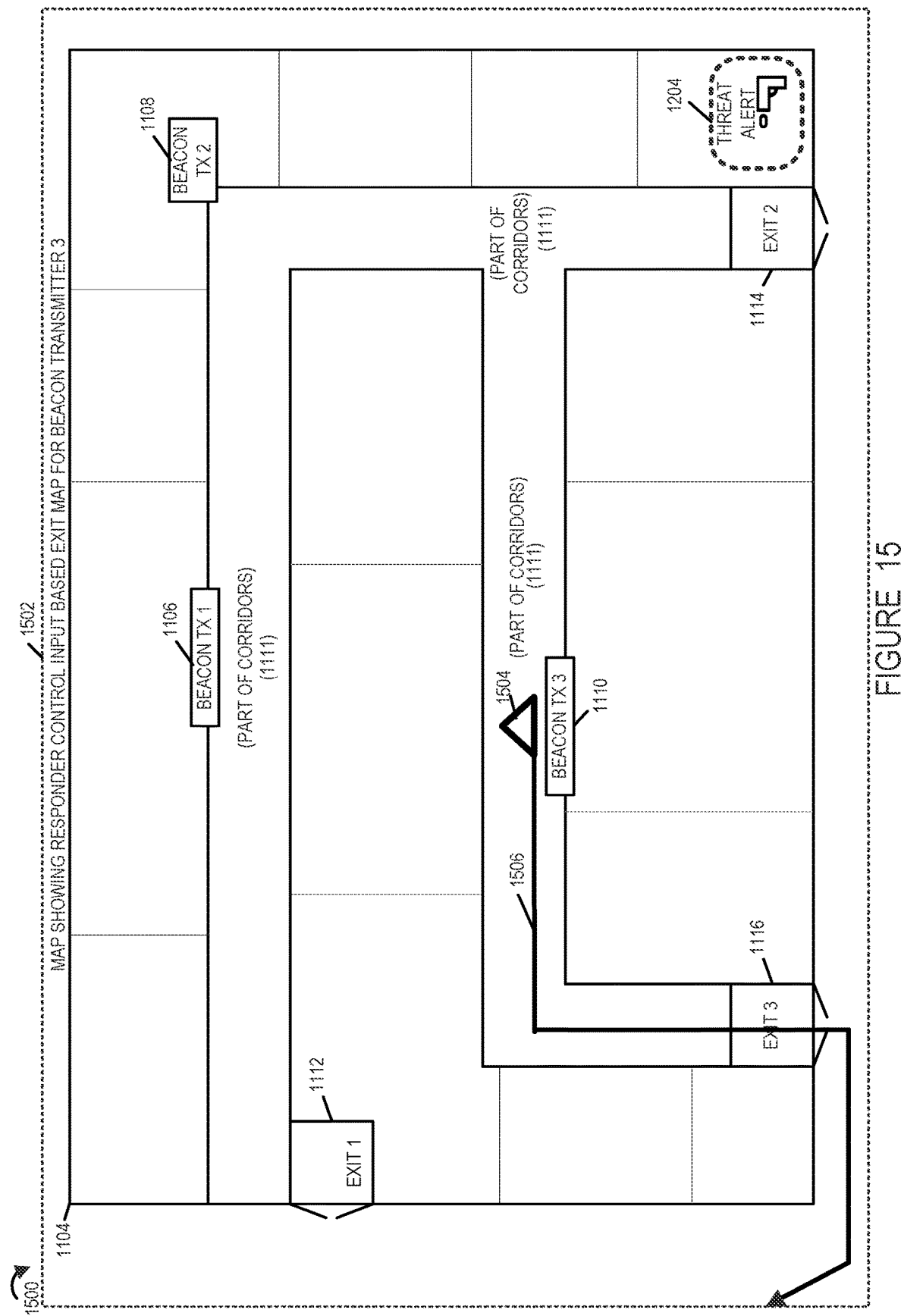
FIG. 15 is a drawing showing a responder control user input based exit map for a third beacon transmitter in accordance with an exemplary embodiment.

FIG. 15 is a drawing 1500 showing a responder control user input based exit map 1502 for beacon transmitter 3 1110. Map 1502 includes the building floor plan layout 1104 including beacon transmitters (beacon transmitter 1 1106, beacon transmitter 2 1108, beacon transmitter 3 1110, corridors 1111, and exits (exit 1 1112, exit 2 1114, exit 3 1116), the threat symbol 1204 identifying the location of the detected threat, a triangle symbol 1504 indicating the location of the beacon transmitter 3 1110, and an arrow 1506 indicating the responder recommended exit path from beacon transmitter 3 1110 to the outsider of the building. In this example the exit path passes through building exit 3 1116.

Figure 16A:
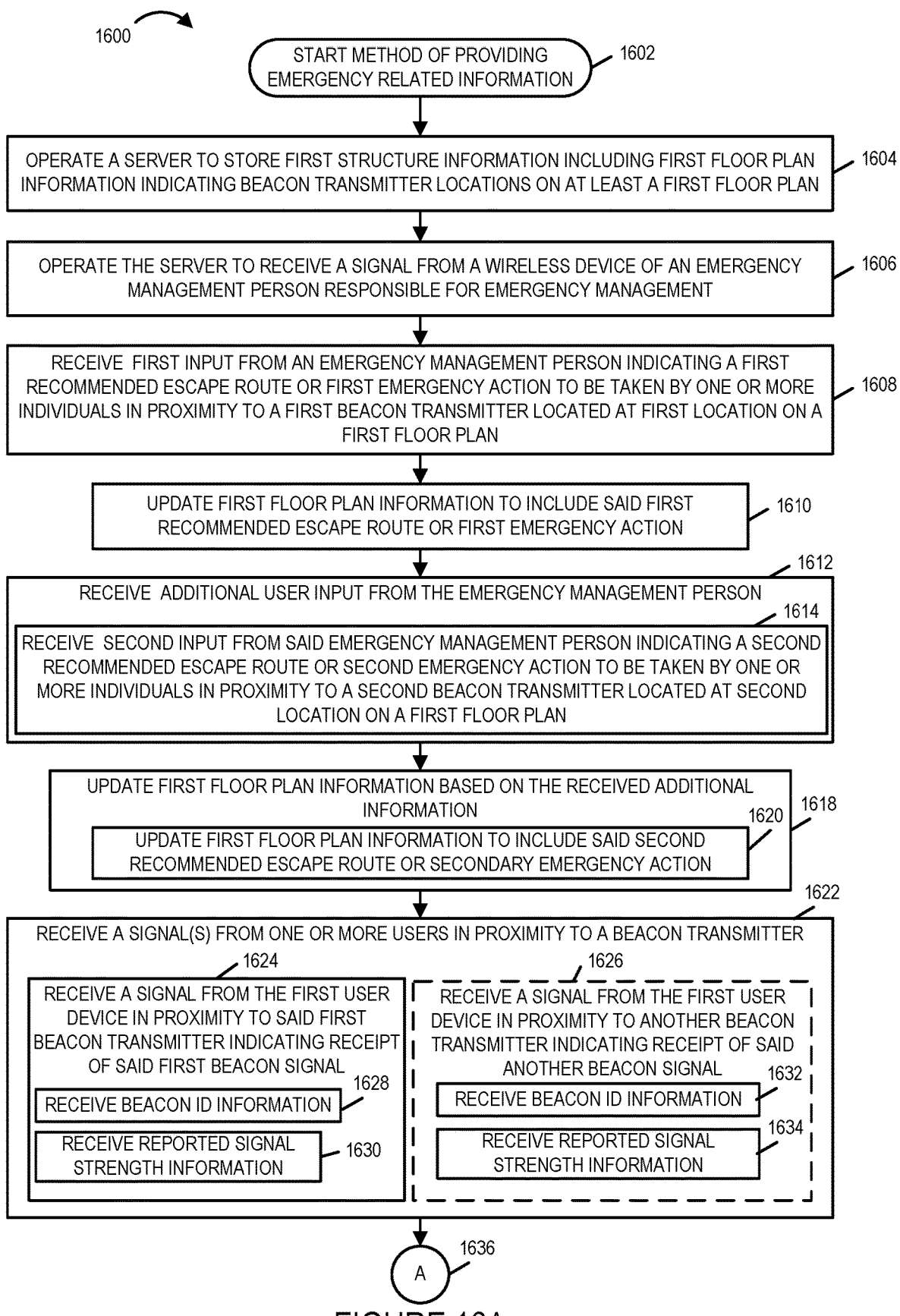
FIG. 16A is a first part of a flowchart of an exemplary method of providing emergency related information in accordance with various exemplary embodiments.

FIG. 16, comprising the FIG. 16A and FIG. 16B, is a flowchart of an exemplary method of providing emergency related information in accordance with various exemplary embodiments. Operation starts in step 1602, in which a server is powered on and initialized, and proceeds to step 1604. In step 1604 the server is operated to store first structure information including first floor plan information indicating beacon transmitter locations on at least a first floor plan. In some embodiments, the first structure information includes a plurality of floor plans corresponding to different floors or a first building, e.g., a first building of a college campus, or different floors or areas of a vessel, e.g., a ship, a bus or a train. In some embodiments, one or more beacon transmitter locations and exits are illustrated on said first floor plan. Operation proceeds from step 1604 to step 1606.

In step 1606, the server is operated to receive a signal from a wireless device of an emergency management person responsible for emergency management. The received signal includes, e.g., information identifying the emergency responder and/or provides authentication and/or authorization information required by the server to allow the emergency management person to update maps and/or provide other emergency instructions via the server system. Operation proceeds from step 1606 to step 1608.

In step 1608 the server receives first input from an emergency management person indicating a first recommended escape route or first emergency action to be taken by one or more individuals in proximity to a first beacon transmitter located a first location on a first floor plan. In some embodiments, the first input indicates a first recommended escape route to be used to exit said structure by a person in proximity to the first beacon transmitter. Operation proceeds from step 1608 to step 1610.

In step 1610 the server updates first floor plan information to include said first recommended escape route or first emergency action. Operation proceeds from step 1610 to step 1612. In step 1612 the server receives additional user input from the emergency management person. Step 1612 includes step 1614 in which the server receives second input from said emergency management person indicating a second recommended escape route or second emergency action to be taken by one or more individuals in proximity to a second beacon transmitter located at a second location on a first floor plan. In some embodiments, the first input indicates a first escape route and the second input indicates a second escape route different from said first escape route. In some embodiments, the first input indicates a first escape route and the second input indicates instruction on a location near said second beacon transmitter to be used as a hiding location. In some such embodiments, the second information further includes instructions for proceeding to the hiding location and/or information on how to secure the hiding location, e.g., how to lock or brace a door. Operation proceeds from step 1612 to step 1618.

In step 1618 the server updates first floor plan information based on the received additional information. Step 1618 includes step 1620 in which the server updates first floor plan information to include said second recommended escape route or second emergency action. Operation proceeds from step 1618 to step 1622. In step 1622 the server receives a signal or signals form one or more users in proximity to a beacon transmitter. Step 1622 includes step 1624. In some embodiments, step 1622 may, and sometimes does, include step 1626.

In step 1624 the server receives a signal from the first user device in proximity to said first beacon transmitter indicating receipt of said first beacon signal. Step 1624 includes steps 1628 and step 1630. In step 1628 the server receives beacon ID information identifying the first beacon transmitter and in step 1630 the server receives reported signal strength information indicated received signal strength at the first user device of the received first beacon signal.

In step 1626 the server receives a signal from the first user device in proximity to another beacon transmitter indicating receipt of said another beacon signal. Step 1626 includes steps 1632 and step 1634. In step 1632 the server receives beacon ID information identifying the another beacon transmitter and in step 1634 the server receives reported signal strength information indicated received signal strength at the first user device of the received another beacon signal.

Operation proceeds from step 1622, via connecting node A 1636, to step 1638. In step 1638 the server makes a determination as to the proximity of the first user device to said first beacon transmitter based on the reported signal strength of the beacon signal received from the first beacon transmitter by the first user device. In some embodiments, operation proceeds from step 1638 to step 1642; in other embodiments, operation proceeds from step 1638 to step 1640.

In step 1640 the server makes a determination as to proximity to said another beacon transmitter based on a reported signal strength of a bacon signal received by the first user device from the another beacon transmitter. Operation proceeds from step 1640 to step 1642.

In step 1642 the server identifies from the received signal strength information from the first user device the nearest beacon transmitter to the first user device. Step 1642 includes step 1644 in which the server identifies the first beacon transmitter as the nearest beacon transmitter to the first user device. Operation proceeds from step 1642 to step 1646.

In step 1646 the server provides at least a portion of said updated first floor plan information to the first user device corresponding to a first person in proximity to said first beacon transmitter. Step 1646 includes step 1648 in which the server provides the escape route and/or other emergency information associated in storage with the first beacon transmitter to the first user device. Operation proceeds from step 1646 to step 1650.

In step 1650 the server receives user input from one or more users. Step 1650 includes step 1652 in which the server receives first user input from the first user, said input providing information observed from the first user. Operation proceeds from step 1650 to step 1654. In step 1654 the server is operated to provide to the wireless device of the first emergency management person said first user input along with received input received from other users in proximity to beacons at a location where an emergency is occurring. Operation proceeds from step 1654 to step 1656.

In step 1656 the serve is operated to communicate location information to the wireless device of the first emergency management person indicating the location of devices which reported detection of beacon signals to the server. In some such embodiments, the server optionally communicates information including a cell phone telephone number of the person's device who reported the information to allow the emergency responder to call the telephone of the individual which reported the beacon signal detection. Operation proceeds from step 1656 to step 1658.

In step 1658 the server receives threat, e.g., shooter location or fire location information, from the wireless device of the emergency management person. The information may be, and sometimes is, based on the information reported by individuals at the scene which was provided to the emergency responder person, but is not posted to other users unless approved for posting by the emergency management, e.g., responder, person. Thus the emergency management person may act as a filter for information. Operation proceeds from step 1658 to step 1660.

In step 1660 the server receives different instructions to be provided to different users based on the user's proximity to a location of concern and rule information to be used to determine which instructions are to be supplied to a user based on the proximity to the location of concern. In some embodiments, the location of concern is a management person indicated possible location of an intruder, e.g., a potential shooter. Operation proceeds from step 1660 to step 1662. In step 1662, the server provides instruction to users, e.g., different instructions to different users, in accordance proximity information and rule information.

Figure 17:
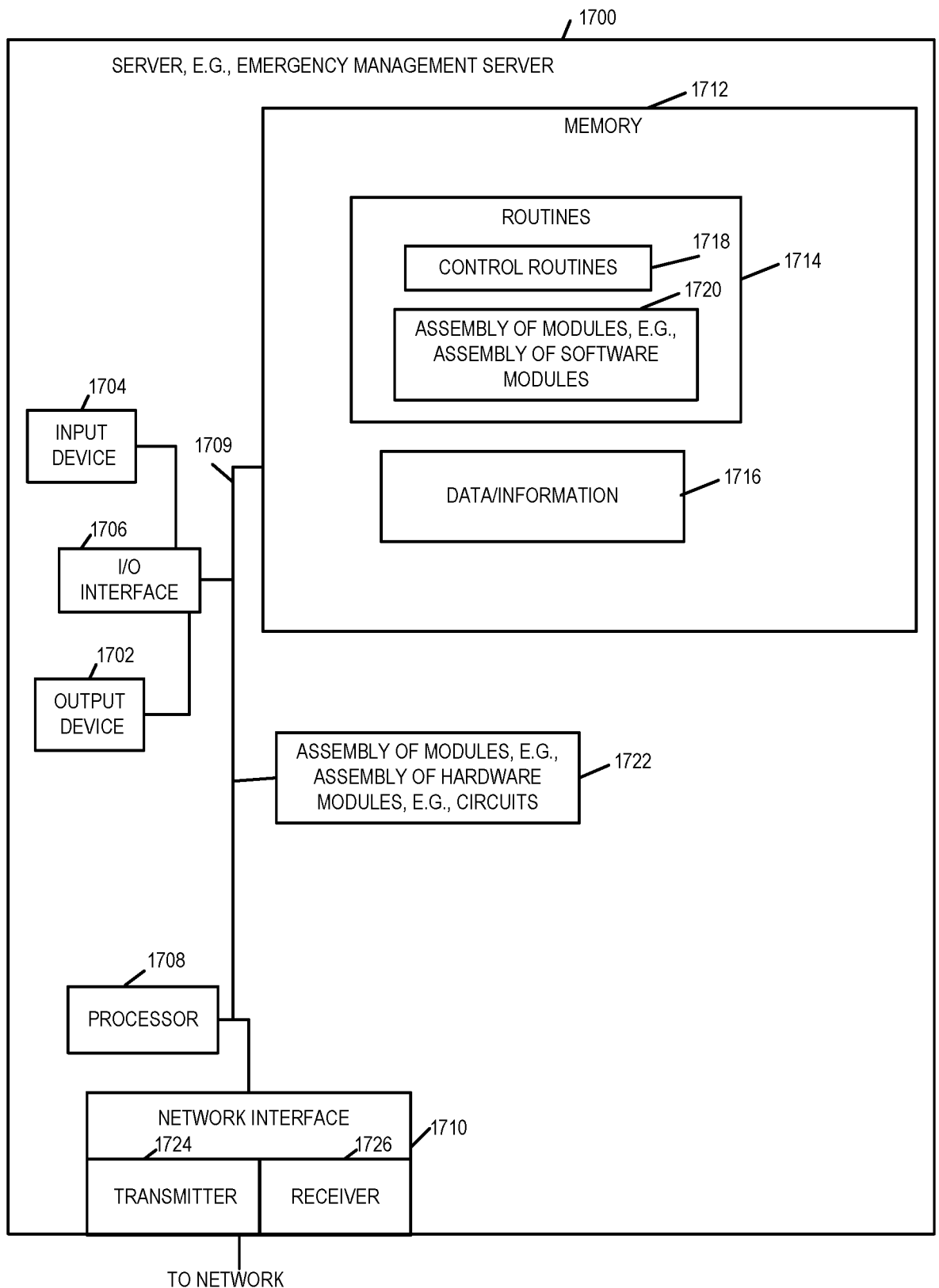
FIG. 17 is drawing of an exemplary server, e.g., an emergency management server which includes beacon management functionality and content delivery management functionality, in accordance with an exemplary embodiment.

FIG. 17 is drawing of an exemplary server 1700, e.g., an emergency management server which includes beacon management functionality and content delivery management functionality, in accordance with an exemplary embodiment. Exemplary server 1700 may implement the method of flowchart 1600 of FIG. 16 and/or flowchart 2300 of FIG. 23. Exemplary server 1700 includes an input device 1704, e.g., a keyboard, mouse, etc., an output device 1702, e.g., a display, an I/O interface 1706, a processor 1708, e.g., a CPU, a network interface 1710, an assembly of modules 1722, e.g., an assembly of hardware modules, e.g., circuits, a memory 1712 and a bus 1709. The input device 1704 and output device 1702 are coupled to the bus 1709 via interface 1706. The I/O interface 1706, assembly of modules 1722, processor 1708, network interface 1710 and memory 1712 are coupled together via bus 1709 over which the various elements may interchange data and information.

Network interface 1710 includes a transmitter 1724 and a receiver 1726. The network interface 1710 couples the server 1700 to a communications network, via which the server may 1710 communicate with beacon transmitter devices and user devices, e.g., an emergency management person's user device and non-emergency management person's user devices. In various embodiments, the communications is via a base station in the communications network.

Memory 1712 includes routines 1714 including control routines 1718 and an assembly of modules 1720, e.g., an assembly of software modules, and data/information 1716. The control routines 1718 controls operation of various elements of the base stations, e.g. controls the input device, control the output device, control the transmitter and receiver, and control the memory to store and retrieve data/information. In some embodiments, the control routines 1718 include a main control routine which calls or executes other routines and/or modules.

In some embodiments, an exemplary server, e.g., server 1700 includes a processor, e.g., processor 1708, configured to control the server to: receive at the server first input from an emergency management person indicating a first recommended escape route or first emergency action to be taken by one or more individuals in proximity to a first beacon transmitter located at a first location on a first floor plan; update first floor plan information to include said first recommended escape route or first emergency action; and provide at least a portion of said updated first floor plan information to a first user device corresponding to a first person in proximity to said first beacon transmitter.

In some such embodiments, said processor is further configured to control the server to: prior to receiving said first input from said first emergency management person, store first structure information including first floor plan information indicating beacon transmitter locations on at least a first floor plan; and receive a signal from a wireless device of an emergency management person responsible for emergency management, e.g., information identifying the emergency responder and/or providing authentication and/or authorization information required by the server to allow the emergency management person to update the maps and/or provide other emergency instructions via the server system.

In some embodiments, said first structure information includes a plurality of floor plans corresponding to different floor of a first building, e.g., a first building of a college campus, or a plurality of floor plans corresponding to a vessel, e.g., ship, bus or train. In various embodiments, one or more beacon transmitter locations and exits are illustrated on said first floor plan.

In some embodiments, said first input indicates a first recommended escape route to be used to exit said structure by a person in proximity to the first beacon transmitter. In some such embodiments, the computer is further configured to control the server to: receive second input from said emergency management person indicating a second recommended escape route or second emergency action to be taken by one or more individuals in proximity to a second beacon transmitter located at a second location on the first floor plan.

In various embodiments, the computer is further configured to control the server to update first floor plan information to include said second recommended escape route or second emergency action. In some such embodiments, said first input indicates a first escape route and said second input indicates a second escape route different from said first escape route. In some embodiments, said first input indicates a first escape route and said second input indicates instruction on a location near said second beacon transmitter to be used as a hiding location. In some such embodiments, said second information further includes instructions for proceeding to the hiding location and/or for information on how to secure the hiding location, e.g., how to lock or brace a door.

In various embodiments, said computer is further configured to control the server to: receive a signal from the first user device in proximity to said first beacon transmitter indicating receipt of said first beacon signal prior to providing said first information. In some such embodiments, said computer is further configured to control the server to: make a determination as to proximity to said first beacon transmitter based on a reported received signal strength of a beacon signal received from said first beacon transmitter. In some such embodiments, said computer is further configured to control the server to: identify from the received signal information from the first user device the nearest beacon transmitter; and provide the escape route and/or other emergency information associated in storage with said first beacon transmitter.

In various embodiments, said computer is further configured to control the server to: receive first user input from said first user, said input providing information observed from said first user; provide to wireless device of the first emergency management person said first user input along with input received from other users in proximity to beacons at a location where an emergency condition exists. In some such embodiments, said computer is further configured to control the server to: communicate location information to the wireless device of the first emergency management persons indicating the location of devices which reported detection of beacon signals to the server, and optionally communicate information including a cell phone telephone number of the person's device who reported the information to allow the emergency responder to call the individual telephone which reported the beacon signal detection.

In some embodiments, said computer is further configured to control the server to: receive threat location information, e.g., shooter or fire location information, from the wireless device of the emergency management person. In some such embodiments, the received threat location information may be, and sometimes is, based on the information reported by individuals at the scene which was provided the emergency management person (responder) but is not posted to others users unless approved for posting by the emergency management person. In some such embodiment, said computer is further configured to control the server to: receive different instructions to be provided to different users based on the user's proximity to a location of concern and rule information to be used to determine which instructions are to be supplied to a user based on proximity to the location of concern. In some embodiments, the location of concern is an emergency management person indicated possible location of an intruder, e.g. a potential shooter.

Figure 18:
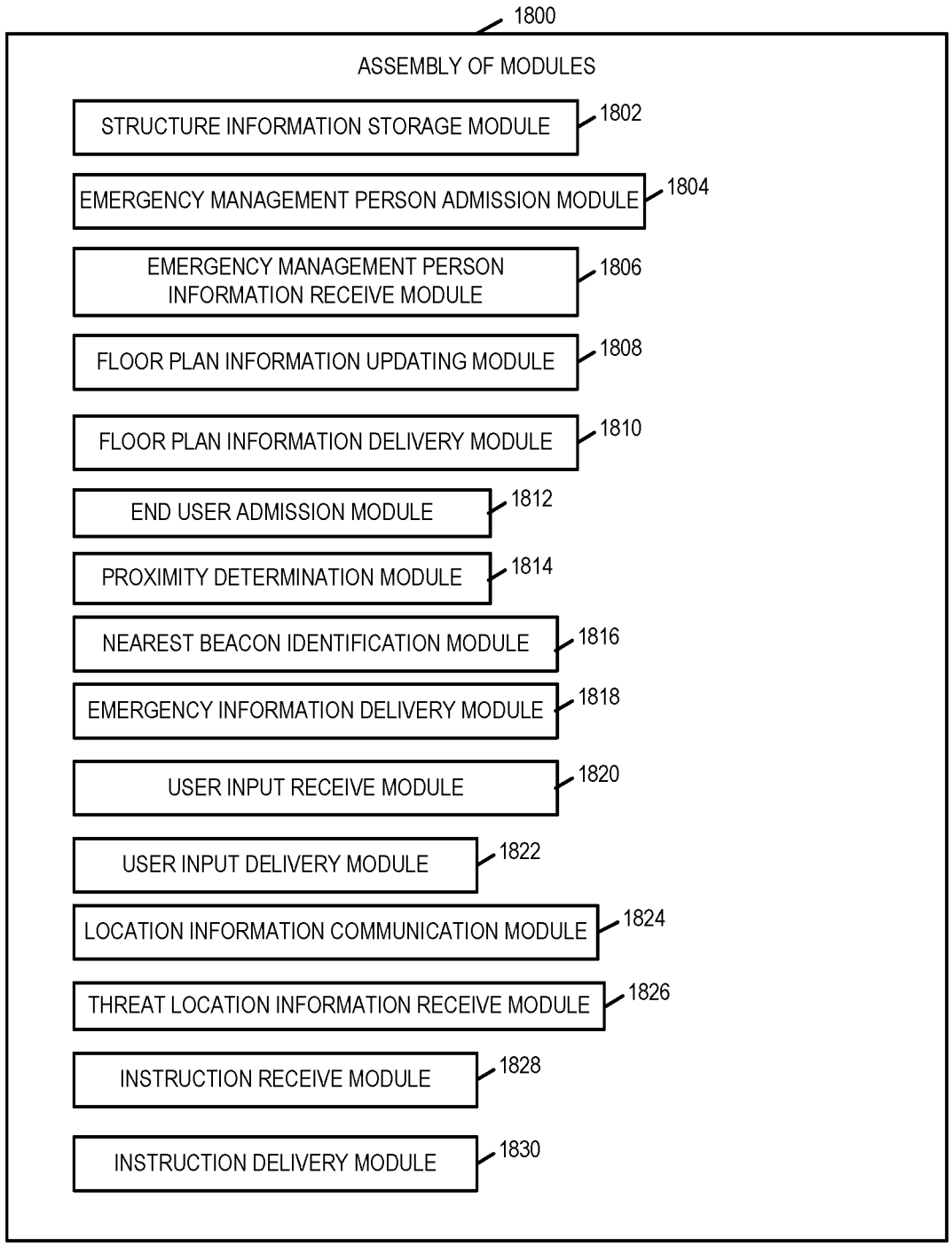
FIG. 18 is a drawing of an assembly of modules that may be included in the exemplary server of FIG. 17 in accordance with an exemplary embodiment.

FIG. 18, illustrates an assembly of modules 1800 which can, and in some embodiments is, used in an exemplary device, e.g., server 1700 illustrated in FIG. 17, e.g., as assembly of modules 1720 and/or 1722. Assembly of modules 1800 can be implemented in hardware within the processor 1708 of the device 1700, e.g., as individual circuits. The modules in the assembly 1800 can, and in some embodiments are, implemented fully in hardware within assembly of modules 1722, e.g., as individual circuits. In other embodiments some of the modules are implemented, e.g., as circuits, within the processor 1708 with other modules being implemented, e.g., as circuits in assembly of modules 1722, external to and coupled to the processor 1708. As should be appreciated the level of integration of modules in the processor and/or with some modules being external to the processor may be one of design choice.

Alternatively, rather than being implemented as circuits, all or some of the modules 1800 may be implemented in software and stored in the memory 1712 of the device 1700 with the modules controlling operation of the device 1700 to implement the functions corresponding to the modules when the modules are executed by a processor, e.g., processor 1708. In some such embodiments, the assembly of modules 1800 is included in the memory 1712, e.g., as assembly of modules 1720. In still other embodiments, various modules are implemented as a combination of hardware and software, e.g., with another circuit external to the processor providing input to the processor 1708 which then under software control operates to perform a portion of a module's function. While shown in the FIG. 17 embodiment as a single processor, e.g., computer, it should be appreciated that the processor 1708 may be implemented as one or more processors, e.g., computers.

When implemented in software the modules include code, which when executed by the processor 1708, configure the processor 1708 to implement the function corresponding to the module. In embodiments where the assembly of modules 1800 is stored in the memory 1712, the memory 1712 is a computer program product comprising a computer readable medium comprising code, e.g., individual code for each module, for causing at least one computer, e.g., processor 1708, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 18 control and/or configure the device 1700 or elements therein such as the processor 1708, to perform the functions of the corresponding steps illustrated in the method of flowchart 1600 of FIG. 16 and/or the method of flowchart 2300 of FIG. 23. Thus the assembly of modules 1800 includes various modules that perform functions of the corresponding steps of the method shown in FIG. 16 and/or FIG. 23.

Assembly of modules 1800 includes a structure information storage module 1802, an emergency management person admission module 1804, an emergency management person information receive module 1806, a floor plan information updating module 1808, a floor plan information delivery module 1810, an end user admission module 1812, a proximity determination module 1814, a nearest beacon identification module 1816, an emergency information delivery module 1818, a user input receive module 1820, a user input delivery module 1822, a location information communication module 1824, a threat location information receive module 1826, an instruction receive module 1828, and an instruction delivery module 1830.

Structure information storage module 1802 is configured to store structure information including site and/or floor plan information including information indicating beacon transmitter locations. Structure information storage module 1802 is configured to store first structure information including first floor plan information indicating beacon transmitter locations on at least a first floor plan. In some embodiments, the first structure information includes a plurality of floor plans corresponding to different floors of a first building, e.g., a first building of a college campus, or a vessel, e.g., a ship, bus, or train. In some embodiments, one or more beacon transmitter locations and exits are illustrated on the first floor plan.

Emergency management person admission module 1804 is configured to receive a signal from a wireless device of an emergency management person responsible for emergency management. For example, the signal identifies the emergency responder and/or provides authentication and/or authorization information required by the server to allow the emergency management person to update maps and/or provide other emergency instructions via the server system.

Emergency management person information receive module 1806 is configured to receive input from an emergency management person indicating a recommended escape route and/or emergency action to be taken my one or more individuals in proximity to a beacon transmitter, e.g., a beacon transmitter location a location on a site or floor plan. Emergency management person information receive module 1806 is configured to receive first input from an emergency management person indicating a first recommended escape route or first emergency action to be taken by one or more individuals in proximity to a first beacon transmitter located at a first location on a first floor plan. Emergency management person information receive module 1806 is configured to receive second input from an emergency management person indicating a second recommended escape route or second emergency action to be taken by one or more individuals in proximity to a second beacon transmitter located at a second location on the first floor plan. Emergency management person information receive module 1806 is configured to receive third input from an emergency management person indicating a third recommended escape route or third emergency action to be taken by one or more individuals in proximity to a third beacon transmitter located at a third location on the first floor plan.

In some embodiments, the first input indicates a first recommended escape route to be used to exit said structure by a person in proximity to the first beacon transmitter. In some embodiments, the second input indicates a second recommended escape route to be used to exit said structure by a person in proximity to the second beacon transmitter. In some embodiments, the third input indicates a third recommended escape route to be used to exit said structure by a person in proximity to the third beacon transmitter. In various embodiments, the first input indicates a first escape route and said second input indicates a second escape route different from said first escape route. In various embodiments, the first input indicates a first escape route, said second input indicates a second escape route, and the third input indicates a third escape route and the three escapes routes are different from one another.

In some embodiments, the first input indicates a first escape route and the second input indicates an instruction on a location near said second beacon transmitter to be used as a hiding location. In some such embodiments, the second information further indicates instructions for proceeding to the hiding location and/or information on how to secure the hiding location, e.g., how to lock or brace a door.

In some embodiments, the first input indicates a first escape route via a designated exit, e.g., an identified exit door, and the second input indicates a second escape route via a makeshift emergency exit, e.g., a window on the first floor of a building. Floor plan information updating module 1808 is configured to update site or floor plan information to include a recommended escape route or emergency action, e.g., based on information received by module 1806. Floor plan information updating module 1808 is configured to update first floor plan information to include said first recommended escape route or first emergency action. Floor plan information updating module 1808 is configured to update first floor plan information to include said second recommended escape route or second emergency action. Floor plan information updating module 1808 is configured to update first floor plan information to include said third recommended escape route or third emergency action.

Floor plan information delivery module 1810 is configured to provide at least a portion of updated floor plan information to a user device corresponding to a person in proximity to a beacon transmitter. Floor plan information delivery module 1810 is configured to provide at least a portion, e.g., a first portion, of said updated first floor plan information to a first user device corresponding to a first person in proximity to said first beacon transmitter. Floor plan information delivery module 1810 is configured to provide at least a portion, e.g., a second portion, of said updated first floor plan information to a second user device corresponding to a second person in proximity to said second beacon transmitter. Floor plan information delivery module 1810 is configured to provide at least a portion, e.g., a third portion, of said updated first floor plan information to a third user device corresponding to a third person in proximity to said third beacon transmitter. Floor plan information delivery module 1810 is configured to provide at least a portion, e.g., a first portion, of said updated first floor plan information to a fourth user device corresponding to a fourth user in proximity to said first beacon transmitter. Floor plan information delivery module 1810 is configured to provide at least a portion, e.g., a second portion, of said updated first floor plan information to a fifth user device corresponding to a fifth person in proximity to said second beacon transmitter. Floor plan information delivery module 1810 is configured to provide at least a portion, e.g., a third portion, of said updated first floor plan information to a sixth user device corresponding to a sixth person in proximity to said third beacon transmitter.

End user admission module 1812 is configured to receive a signal from a user device in proximity to a beacon transmitter indicating receipt of a beacon signal prior to providing information to the user. In various embodiments, the signal indicating receipt of the beacon signal communicates a beacon transmitter ID. In some such embodiments, the signal indicating receipt of the beacon signal includes information indicating the received signal strength of the received beacon signal as determined by the user device. End user admission module 1812 is configured to receive a signal, e.g., a signal including a first beacon transmitter identifier, from a first user device in proximity to the first beacon transmitter indicating receipt of the first beacon signal prior to providing first information to the first user device. End user admission module 1812 is configured to receive a signal, e.g., a signal including a second beacon transmitter identifier, from a second user device in proximity to the second beacon transmitter indicating receipt of the second beacon signal prior to providing second information to the second user device. End user admission module 1812 is configured to receive a signal, e.g., a signal including a third beacon transmitter identifier, from a third user device in proximity to the third beacon transmitter indicating receipt of the third beacon signal prior to providing third information to the third user device.

Proximity determination module 1814 is configured to make a determination as to a proximity to a beacon transmitter based on a reported signal strength of a beacon signal received from a beacon transmitter. Proximity determination module 1814 is configured to make a determination as to a proximity to the first beacon transmitter based on a reported signal strength of a first beacon signal received from the first beacon transmitter. Proximity determination module 1814 is configured to make a determination as to a proximity to the second beacon transmitter based on a reported signal strength of a second beacon signal received from the second beacon transmitter. Proximity determination module 1814 is configured to make a determination as to a proximity to the third beacon transmitter based on a reported signal strength of a third beacon signal received from the third beacon transmitter.

Nearest beacon identification module 1816 is configured to identify from received signal information from a user device the nearest beacon transmitter to the user device. For example, nearest beacon identification module 1816 is configured to identify from the received signal information from the first user device the nearest beacon transmitter to the first user device. In some embodiments, a user device sends a list of received beacons, e.g., a list of received beacon identifiers, and corresponding received signal strength information for each of the received beacons. In some such embodiments, module 1816 uses the list of received beacon identifier, corresponding reported received beacon strength information, and knowledge of beacon transmission power information to determine the nearest beacon to the user device. In some such embodiments, at least some beacons are transmitted at different power levels.

Emergency information delivery module 1818 is configured to provide the escape route and/or other emergency information associated in storage with a beacon transmitter, e.g., the identified nearest beacon transmitter, to a user device. For example, emergency information delivery module 1818 is configured to provide the escape route and/or other emergency information associated in storage with said first beacon transmitter to a first user device which has been determined to be nearest to the first beacon transmitter among a plurality of possible alternative beacon transmitters.

User input receive module 1820 is configured to user input from a user, said input providing information observed by the user. For example, user input receive module 1820 is configured to receive first user input from a first user, said input providing information observed from the first user. Exemplary user input from the first user includes, e.g., information on the intensity of a fire, information on the direction of spreading of a fire, information on smoke, information on the number of persons in an area, information on a location or movement of a shooter, information on noises heard, e.g., shoots being fired, etc.

User input delivery module 1822 is configured to provide to the wireless device of an emergency management person, e.g., the first emergency management person, user input received from user devices, e.g. first user input form the first user device along with input received from other users in proximity to beacons at a location where an emergency condition exists. In some embodiments, user input delivery module aggregates information received from multiple user devices by module 1820.

Location information communication module 1824 is configured to communicate information to the wireless device of an emergency management person, e.g., the first emergency management person, indicating the location of devices which reported detection of beacon signals to the server. In some embodiments, location information communication module 1824 further optionally communicate information including the cell phone telephone number(s) of the person(s) who reported information to allow the emergency responder to call an individual telephone which reported the beacon signal detection.

Threat location information receive module 1826 is configured to receive threat location information, e.g., shooter or fire location information, from the wireless device of the emergency management person. In some embodiments the information may be based on the information reported by individuals at the scene which was provided the emergency management person, e.g., responder. In some embodiments, the information is not posted to other user unless approved by posting of the emergency management person. Thus in at least some embodiments, the emergency management person acts as a filter on information received from user devices in vicinity to an emergency, e.g., so as not to cause a panic condition, not to release unsubstantiated information, and/or not to broadcast information that may be intercepted and used by a threat suspect, e.g., a shooter.

Instruction receive module 1828 is configured to receive different instructions to be provided to different users based on proximity to a location of concern and rule information to be used to determine which instructions are to be supplied to a user based on proximity to the location of concern. In some such embodiment the location of concern is an emergency management person indicated possible location of an intruder, e.g., a potential shooter.

Instruction delivery module 1830 is configured to identify which instruction, e.g., from among a plurality of alternative instructions, received by module 1828, to communicate to a user device based on proximity of the user device to a location of concern in accordance with rule information, e.g. rule information from the management device, and to communicate the identified instruction to the user device.

In some embodiments, server 1700 comprises: an emergency management person information receive module configured to receive at the server first input from said emergency management person indicating a first recommended escape route or first emergency action to be taken by one or more individuals in proximity to a first beacon transmitter located at a first location on a first floor plan; floor plan information updating module configured to update first floor plan information to include said first recommended escape route or first emergency action; and floor plan information delivery module configured to provide at least a portion of said updated first floor plan information to a first user device corresponding to a first person in proximity to said first beacon transmitter. In some such embodiments, server 1700 further comprises: a structure information storage module configured to store first structure information including first floor plan information indicating beacon transmitter locations on at least a first floor plan; an emergency management person admission module configured to receive a signal from a wireless device of an emergency management person responsible for emergency management, e.g., a signal identifying the emergency person, e.g., responder, and/or providing authentication and/or authorization information required by the server to allow the emergency management person to update the maps and/or provide other emergency instructions via the server system.

In various embodiments, first structure information includes a plurality of floor plans corresponding to different floors of a first building, e.g., a first building of a college campus or a plurality of floor plans corresponding to different portions of a vessel, e.g., ship, bus or train. In some embodiments, one or more beacon transmitter locations and exits are illustrated on said first floor plan.

In some embodiments, said first input indicates a first recommended escape route to be used to exit said structure by a person in proximity to the first beacon transmitter.

In various embodiments, said emergency management person information receive module is further configured to receive second input from said emergency management person indicating a second recommended escape route or second emergency action to be taken by one or more individuals in proximity to a second beacon transmitter located at a second location on the first floor plan. In some such embodiments, said floor plan information updating module is further configured to update first floor plan information to include said second recommended escape route or second emergency action.

In some embodiments, said first input indicates a first escape route and said second input indicates a second escape route different from said first escape route. In some other embodiments, said first input indicates a first escape route and said second input indicates instruction on a location near said second beacon transmitter to be used as a hiding location. In some such embodiments, said second information further includes instructions for proceeding to the hiding location and/or for information on how to secure the hiding location, e.g., how to lock or brace a door.

In various embodiments, server 1700 further comprises an end user admission module configured to receive a signal from the first user device in proximity to said first beacon transmitter indicating receipt of said first beacon signal prior to providing said first information. In some such embodiments, server 1700 further comprises: a proximity determination module configured to make a determination as to proximity to said first beacon transmitter based on a reported received signal strength of a beacon signal received from said first beacon transmitter. In some embodiments, server 1700 further comprises: a nearest beacon identification module configured to identify from the received signal information from the first user device the nearest beacon transmitter; and an emergency information delivery module configured to provide the escape route and/or other emergency information associated in storage with said first beacon transmitter.

In various embodiments, server 1700 comprises: a user input receive module configured to receive first user input from said first user, said input providing information observed from said first user; and a user input delivery module configured to provide to wireless device of the first emergency management person said first user input along with input received from other users in proximity to beacons at a location where an emergency condition exists. In some such embodiments, the server 1700 of further comprises: a location information communication module configured to communicate location information to the wireless device of the first emergency management person indicating the location of devices which reported detection of beacon signals to the server. In some embodiments, server 1700 further comprises a cell number communications module configured to provide to the emergency management person user contact information including a cell phone telephone number of the person's device who reported the information to allow the emergency responder to call the individual telephone which reported the beacon signal detection.

In some embodiments, server 1700 comprises: a threat location information receive module configured to receive threat location information, e.g., shooter location information or fire location information, from the wireless device of the emergency management person. In some such embodiments, the information may be based on the information reported by individuals at the scene which was provided the emergency management person (responder) but is not posted to others users unless approved for posting by the emergency management person.

In various embodiments, server 1700 further comprises: an instruction receive module configured to receive different instructions to be provided to different users based on the user's proximity to a location of concern and rule information to be used to determine which instructions are to be supplied to a user based on proximity to the location of concern. In some such embodiments, the location of concern is an emergency management person indicated possible location of an intruder, e.g. potential shooter.

Figure 19:
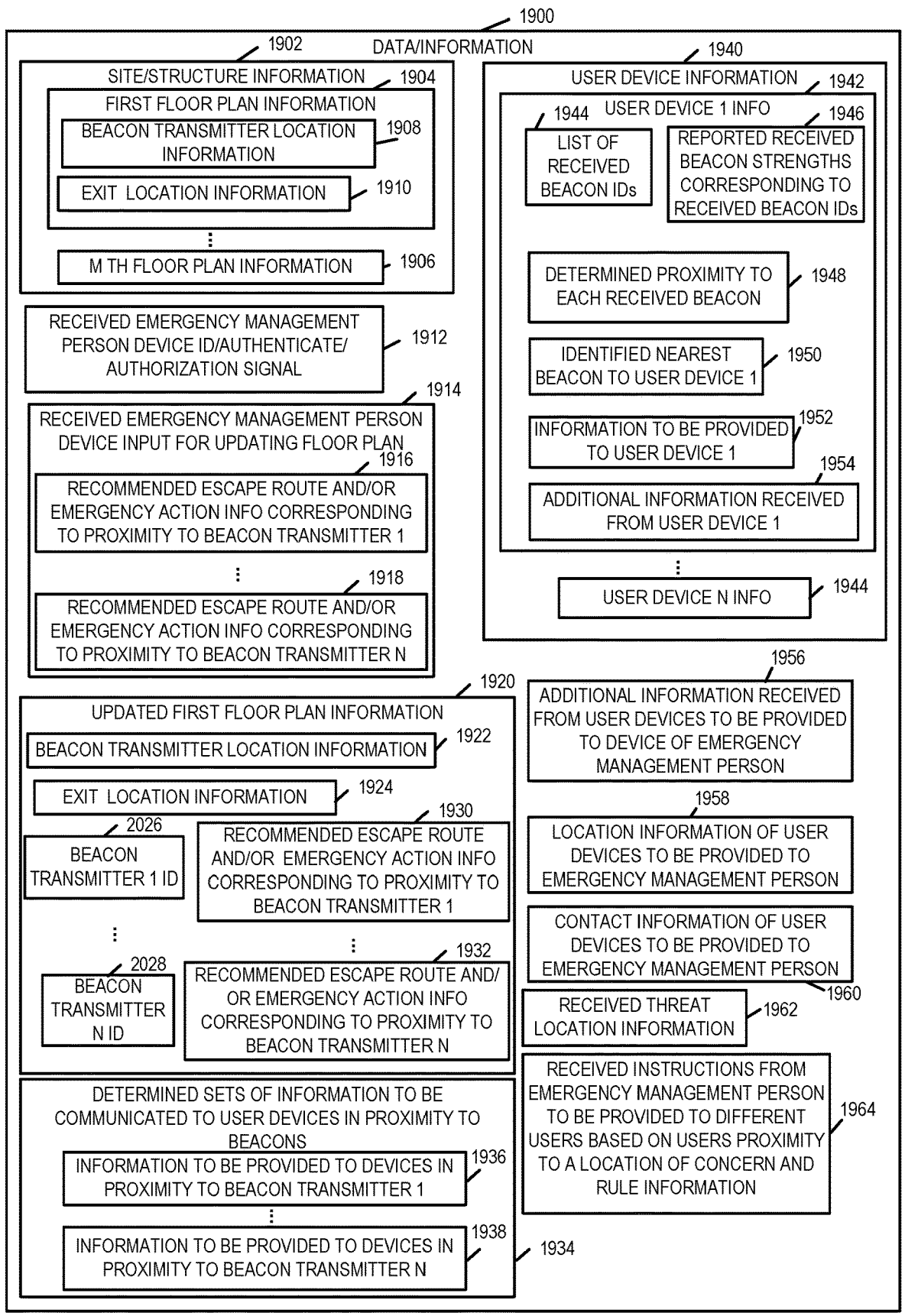
FIG. 19 is a drawing of exemplary data/information that may be included in the exemplary server of FIG. 17 in accordance with an exemplary embodiment.

FIG. 19 is a drawing of exemplary data/information 1900 that may be included in server device in accordance with an exemplary embodiment. For example, data/information 1900 may be data/information 1716 of server 1700 of FIG. 17. Data/information 1900 includes site/structure information 1902, received emergency management person device ID/authenticate/authorization signal(s) information 1912, received emergency management person device input for updating floor pan 1914, and updated first floor plan information 1920. Site/structure information 1902 includes floor plan information corresponding to one or more floor plans (first floor plan information 1904, . . . , Mth floor plan information 1906. First floor plan information 1904 includes beacon transmitter location information 1908 and exit location information 1910. Received emergency management person device input for updating first floor plan 1914 includes an emergency management person recommended escape route and/or an emergency action corresponding to a plurality of beacon transmitters (recommended escape route and/or emergency action information to be taken by one or more individuals in proximity to beacon transmitter 1 on the first floor plan 1916, . . . , recommended escape route and/or emergency action information to be taken by one or more individuals in proximity to beacon transmitter N on the first floor plan 1918).

Updated first floor plan information 1920 includes beacon transmitter location information 1922, exit location information 1924, a set of beacon transmitter IDs (beacon transmitter 1 ID 2026, . . . , beacon transmitter N ID 2028) and a corresponding information for each beacon transmitter ID (recommended escape route and/or emergency action information corresponding to the proximity of beacon transmitter 1, . . . , recommended escape route and/or emergency action information corresponding to proximity to beacon transmitter N 1932), respectively.

Data/information 1934 further includes a determined sets of information to be communicated to user devices in proximity to beacons (information to be provided to user devices in proximity to beacon transmitter 1 1936, . . . , information to be provided to devices in proximity to beacon transmitter N 1938). A determined set of information, e.g., includes for example, updated floor plan information corresponding to a particular beacon ID and may further include additional information provided by the emergency management person, e.g., additional aggregated filtered information based on reported information from a plurality of user devices and/or known by the management person.

Data/information 1900 further includes user device information corresponding to a plurality of user devices, e.g., non-management person user devices, (user device 1 information 1942, . . . , user device N information 1944), additional information received from user devices to be provided to the device of an emergency management person 1956, location information of user devices to be provided to an emergency management person 1958, contact information of user devices, e.g., reported to be in the vicinity of beacon transmitters, to be provided to an emergency management person 1960, received threat location information 1962, e.g., a location of a fire or shooter, and received instruction form an emergency management person to be provided to different users based on a user's proximity to a location of concern and rule information 1964. User device 1 information 1942 includes a list of reported received beacon IDs 1944 and a corresponding list of corresponding received beacon strengths corresponding to the received beacon IDs 1946. User device 1 information 1942 further includes determined proximity of user device 1 to each received reported beacon 1948, an identified nearest beacon to user device 1 1952, and additional information received from user device 1 1954, e.g., intended to be reported to an emergency management person.

Figure 20:
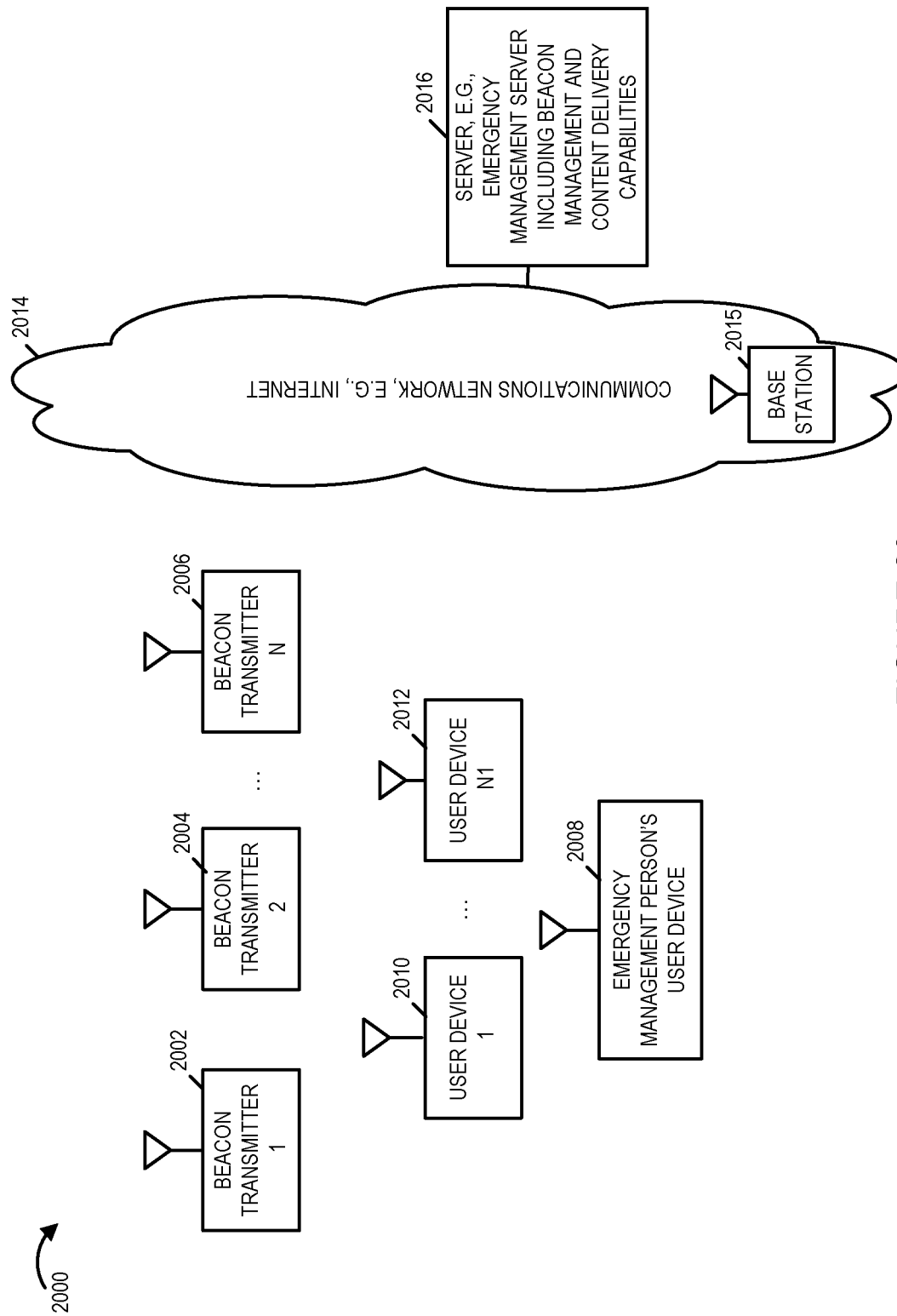
FIG. 20 is a drawing of an exemplary communications system including a plurality of beacon transmitters, an emergency management person's user device, a plurality of user devices, a communications network, and a server, e.g., an emergency management server including beacon management and content delivery capabilities, in accordance with an exemplary embodiment.

FIG. 20 is a drawing of an exemplary communications system 2000 including a plurality of beacon transmitters (beacon transmitter 1 2002, beacon transmitter 2 2004, . . . , beacon transmitter N 2006), an emergency management person's user device 2008, a plurality of user devices (user device 1 2010, . . . , user device N1 2012), a communications network 2014 including at least one base station 2015, and a server 2016, e.g., an emergency management server including beacon management and content delivery capabilities. Server 2016 is, e.g., sever 1700 of FIG. 17 and/or a server implementing a method in accordance with flowchart 1600 of FIG. 16. The beacon transmitter (2002, 2004, . . . , 2006) are, e.g., beacon transmitters located at known locations on a first floor plan. The user devices (2010, . . . , 2012), e.g., non-emergency management personnel user devices, may be located at a first structure corresponding to the first floor plan and may be able to receive one or more of beacon signals transmitted by the beacon transmitters (2002, 2004, 2006). In various embodiments, each beacon transmitter communicates a beacon ID corresponding to the beacon transmitter.

The emergency management person's device 2008 sends information to server 2016 to update a floor plan, e.g., communicating a recommended escape route and/or an emergency action to be taken by one or more individuals in proximity to a beacon transmitter, with different information corresponding to at least some different beacon transmitters. The server 2016 maintains sets information corresponding to each beacon transmitter including information to be communicated to a user device in proximity to a beacon transmitter. User devices (2010, . . . , 2012) report received beacon ID(s) and received beacon signal strength information to server 2016. The server 2016 determines the information to be communicated to a user device reporting at least one detected beacon signal, and sends the information to the user device. A user device may, and sometimes does, communicate additional information to the server, the information intended to be communicated to the emergency management person. The server 2016 aggregates the additional information from user devices (2010, . . . , 2012) and communicates the additional information to the emergency management person's user device 2008. The emergency management person's user device 2008 processes, e.g., filters, the received additional information and communicates processed information and instructions to be provided to different users. The server 2016 sends the processed information to user devices (2010, . . . , 2012) in accordance with proximity information, instructions and rules.

Figure 21:
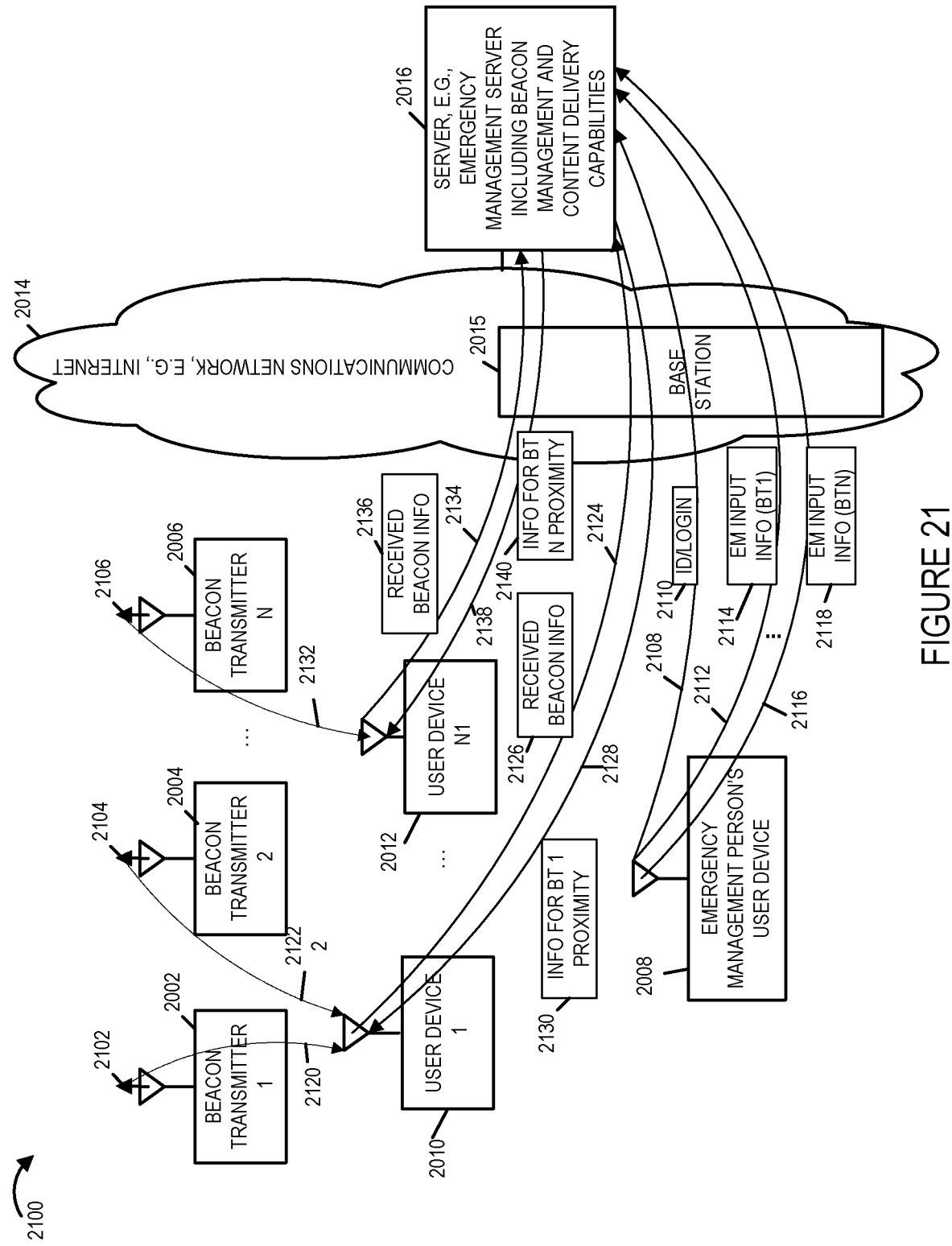
FIG. 21 is a drawing illustrating exemplary signaling in the exemplary system of FIG. 20 in accordance with an exemplary embodiment.
Figure 22:
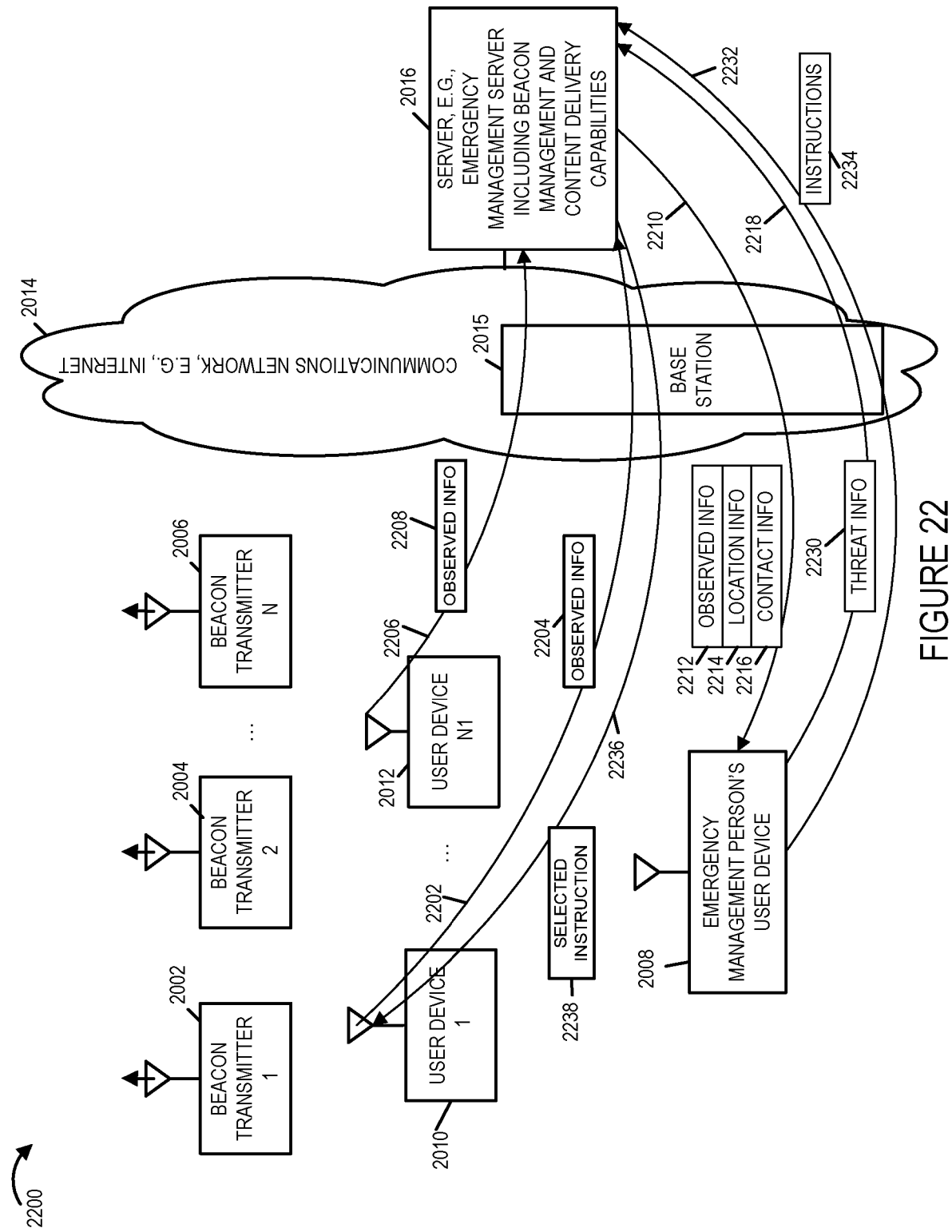
FIG. 22 is a drawing illustrating additional exemplary signaling in the exemplary system of FIG. 20 in accordance with an exemplary embodiment.

Drawings 2100 and 2200 of FIG. 21 and FIG. 22, respectively illustrates exemplary signaling in system 2000 for an example in accordance with an exemplary embodiment. Each beacon transmitter is (beacon transmitter 1 2002, beacon transmitter 2 2004, . . . , beacon transmitter N 2006) is transmitting a beacon signal (2102, 2104, . . . , 2106), communicating a beacon transmitter identifier (beacon transmitter 1 ID, beacon transmitter 2 ID, . . . , beacon transmitter N ID), respectively.

The emergency management person's user device 2008 generates and sends signal 2108 to server 2016 communicating the emergency management person's ID information, authentication information and/or authorization information to allow login. The emergency management person's user device 2008 generates and sends signals (2112, . . . , 2116) to server 2016. Signal 2112 communicates emergency management input information 2114 indicating a recommended escape route or emergency action to be taken by one or more devices in proximity to beacon transmitter 1. Signal 2116 communicates emergency management input information 2118 indicating a recommended escape route or emergency action to be taken by one or more devices in proximity to beacon transmitter N.

The server receives the signals (2112, . . . , 2116) recovers the information (2114, . . . , 2118) and updates floor plan information to include the recovered information. The server also associates the different information (2114, . . . , 2118) with different beacon transmitters. User device 1 2010 receives beacons (2102, 2104), as indicated by arrows (2120, 2122), and measures the strength of the received beacons. User device 1 2010 generates and sends signal 2124 to server 2016 communicating received beacon information 2126 including: the beacon ID corresponding to beacon transmitter 1, the measured received strength of the detected beacon signal from beacon transmitter 1, the beacon ID corresponding to beacon transmitter 2, and the measured received strength of the detected beacon signal from beacon transmitter 2. Server 2016 receives signal 2124, recovers the information 2126, determines a proximity of user device 1 2010 with respect to beacon transmitter 1 and beacon transmitter 2, identifies that beacon transmitter 1 is the nearest beacon transmitter to user device 1 2010.

Server 2016 retrieves stored information intended to be delivered to user devices in the proximity of beacon transmitter 1 2002, generates signal 2128 including information 2130 for user devices in proximity to beacon transmitter 1, e.g., including the escape route and/or other emergency information associated in storage with the first beacon transmitter. In some embodiments, information 2130 is a map including a recommended escape route, e.g., leading from the location of beacon transmitter 1 to a particular exit, or an emergency instruction, e.g. information indicating to lock or barricade the door and remain in the room or information to proceed to an indicated hiding location.

User device N1 2012 receives beacon 2106, as indicated by arrow 2132, and measures the strength of the received beacon. User device N1 2012 generates and sends signal 2134 to server 2016 communicating received beacon information 2136 including: the beacon ID corresponding to beacon transmitter N, and the measured received strength of the detected beacon signal from beacon transmitter N. Server 2016 receives signal 2134, recovers the information 2136, determines a proximity of user device N1 2012 with respect to beacon transmitter N 2006, identifies that beacon transmitter N 2006 is the nearest beacon transmitter to user device N1 2012.

Server 2016 retries stored information intended to be delivered to user devices in the proximity of beacon transmitter N1 2006, generates signal 2138 including information 2140 for user devices in proximity to beacon transmitter N, e.g., including the escape route and/or other emergency information associated in storage with beacon transmitter N 2006.

User device 1 2010 generates and sends signal 2202 including user 1 observed information 2204 to server 2016, which receives the signal and recovers the information. User device N1 2012 generates and sends signal 2206 including user N1 observed information 2208 to server 2016, which receives the signal and recovers the information.

Server 2016 generates and sends signal 2210 to the emergency management person's user device 2208 including observed information 2212, which is an aggregate of information 2204 and 2206, location information 2214 corresponding to user devices 2010 and 2012, and contact information 2216, e.g., cell phone numbers for user device 2010 and 2012. Device 2008 receives signal 2210, recovers the information (2212, 2214, 2216), and processes the information. Device 2008 generates and sends signal 2218 including threat information 2230, e.g., a fire location or a last known or estimated location of an intruder, to server 2016. Device 2008 estimates the proximity of the user devices (2010, 2012) with respect to the location of the threat. Device 2008 generates and sends signal 2232 including instructions 2234 to server 2016, which receives the signal and recovers the instructions. In some embodiments, different instructions are to be provided to different users based on a user's proximity to a location of concern and rule information. In this example, server 2016 generates and sends signal 2236 including one selected instruction 2238 to user device 1 2010.

Figures 23, 23A, 23B:
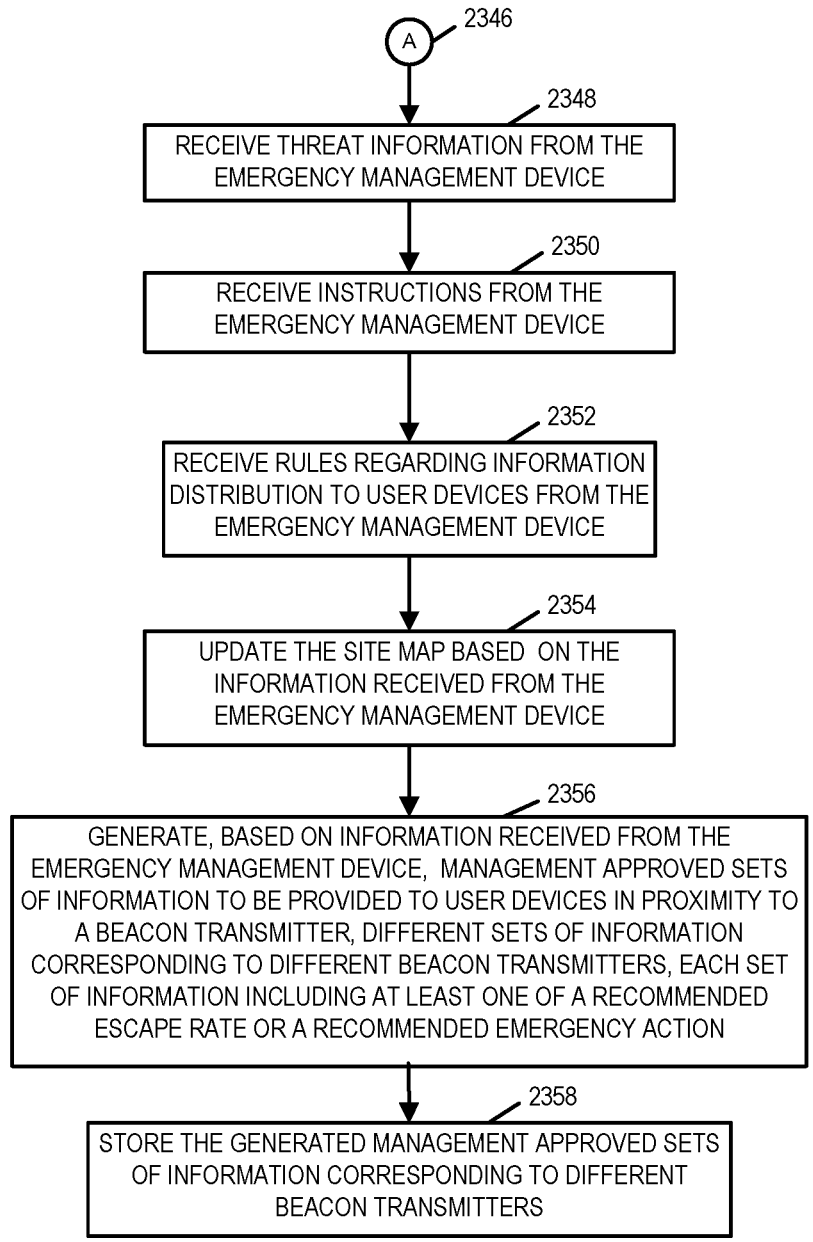
FIG. 23A is a first part of a flowchart of an exemplary method of operating a server, e.g., an emergency management server, in accordance with various exemplary embodiments.
FIG. 23B is a second part of a flowchart of an exemplary method of operating a server, e.g., an emergency management server, in accordance with various exemplary embodiments.
FIG. 23 comprises the combination of FIG. 23A and FIG. 23B.
Figure 23A:
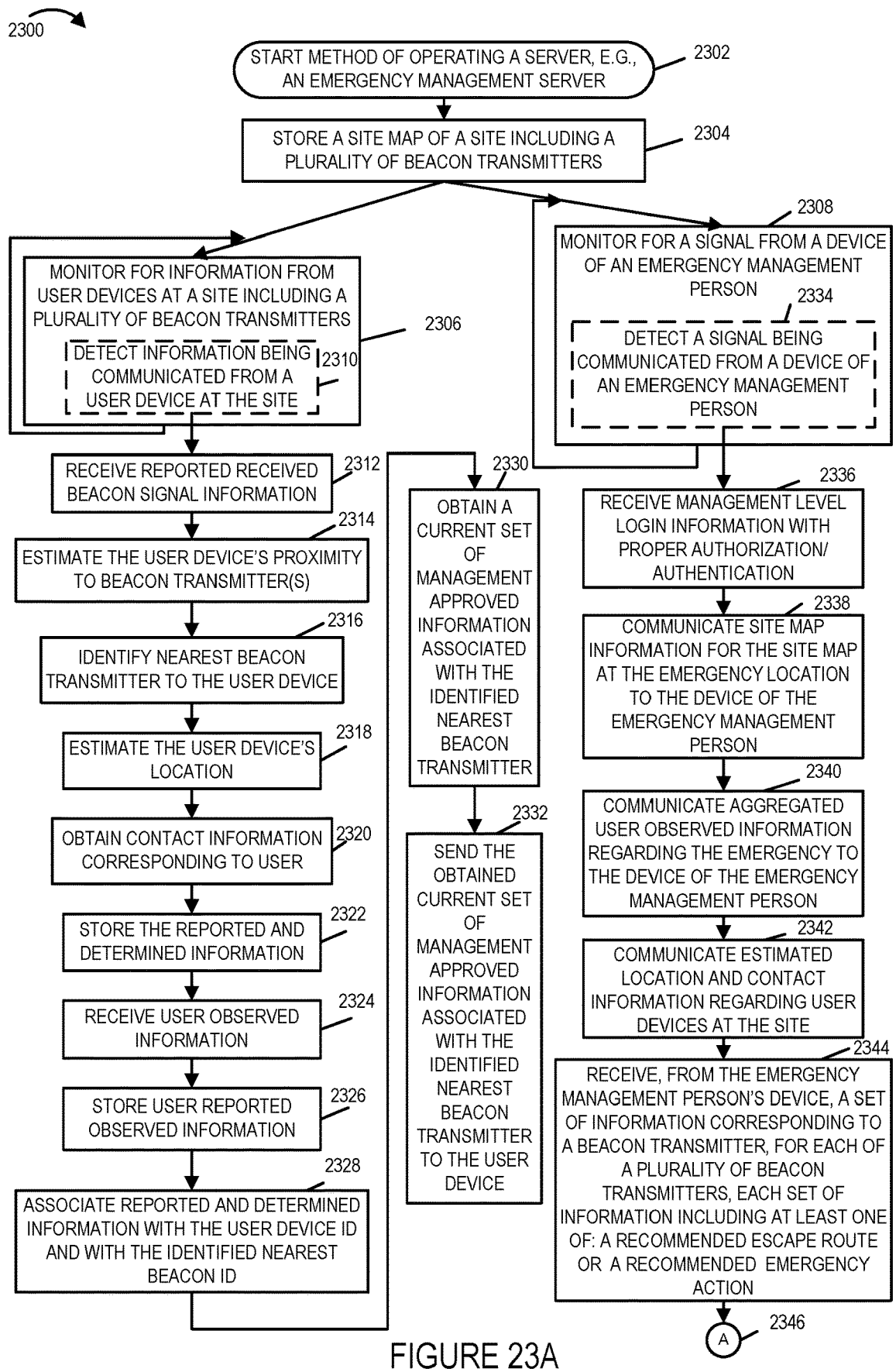

FIG. 23, comprising the combination of FIG. 23A and FIG. 23 B, is a flowchart 2300 of an exemplary method of operating a server, e.g., an emergency management server, in accordance with various embodiments. In various embodiments, the exemplary method of flowchart 2300 provides emergency related information. Operation starts in step 2302 in which the server is powered on and initialized. Operation proceeds from step 2302 to step 2304. In step 2304 the server stores a site map of a site including a plurality of beacon transmitters. In various embodiments, the site map includes first structure information including first floor plan information indicating beacon transmitter locations on at least a first floor plan. In some embodiments, the first structure information includes a plurality of floor plans corresponding to different floors of a first building, e.g., a first building of a college campus, or different floors or different areas of a vessel, e.g., a ship, bus or train. In some embodiments, one or more beacon transmitter locations and exits are illustrated on the first floor plan. Operation proceeds from step 2304 to step 2306 and step 2308.

In step 2306, which is performed on an ongoing basis, the server monitors for information from user devices at the site including a plurality of beacon transmitters. Step 2306 may, and sometimes does, include step 2310, in which the server detects information being communicated from a user device at the site. Operation proceeds from step 2310 to step 2312.

In step 2312 the server receives reported received beacon signal information from the user device, e.g., a list of beacon transmitter identifiers corresponding to the beacon signals detected by the user device and corresponding received signal strength information for each of the detected beacon signals. In some embodiments, in step 2312 the server receives a signal from a first user device in proximity to the first beacon transmitter indicating receipt of a first beacon signal which was transmitted by the first beacon transmitter. Operation proceeds from step 2312 to step 2314.

In step 2314 the server estimates the user device's proximity to the beacon transmitter(s) from which beacon signals were detected, e.g., based on the reported received beacon signal strength information, known beacon transmission power information, and estimated channel loss. In some embodiments, in step 2314 the server makes a determination as to proximity to said first beacon transmitter based on the received signal strength of a beacon signal received from the first beacon transmitter. Operation proceeds from step 2314 to step 2316, in which the server identifies the nearest beacon transmitter to the user device, e.g., based on reported received beacon signal strength information, known or reported beacon transmission power level information, and estimated channel conditions between the beacon transmitter and the user device. In some embodiments, in step 2316 the server identifies form the received signal information from the first user device the nearest beacon transmitter to the first user device. Operation proceeds from step 2316 to step 2318, in which the server estimates the user device's location. Operation proceeds from step 2318 to step 2320. In step 2320 the server obtains contact information, e.g., a cell phone number, corresponding to the user of the user device. Operation proceeds from step 2320 to step 2322.

In step 2322 the server stores the reported and determined information. In some embodiments, the server updates the site map with the stored and/or determined information, e.g., placing an user identifier symbol at the approximate location of the user. Operation proceeds from step 2322 to step 2324.

In step 2324, the server receives user observed information communicated from the user device, e.g., information on a fire location, information on fire intensity, smoke information, intruder information, number of intruders, direction of an intruder, other observed threat information, etc. In some embodiments, in step 2324 the server receives first user input from the first user, said first user input providing information observed from the first user. Operation proceeds from step 2324 to step 2326 in which the server stores the user reported observed information. Operation proceeds from step 2326 to step 2328.

In step 2328 the server associates the reported and determined information with the user device ID which reported the information and the beacon ID of the beacon transmitter identified as being nearest to the user device which reported the information. Operation proceeds from step 2328 to step 2330.

In step 2330, the server obtains a current set of management approved information associated with the identified nearest beacon transmitter to the user device. Different current sets of management approved information may be, and sometimes are, associated with different beacon transmitters. In some embodiments, a default set of information for a particular beacon transmitter will be provided prior to an emergency management person providing input to the current emergency condition. In one embodiment, the default set of information includes a site map, e.g., identifying the location of the nearest beacon transmitter and identifying one or more possible exits to be used for an escape route. If the emergency management person has provided input to the current emergency, then the obtained current set of information includes at least one of a recommended escape route, e.g., an escape route leading from the beacon transmitter to an exit, or a recommended emergency action, e.g., stay in place, barricade a door, go to a hiding location, etc., which is recommended to be performed by users in the proximity to the beacon transmitter. Operation proceeds from step 2320 to step 2322.

In step 2322 the server sends the obtained current set of management approved information associated with the identified nearest beacon to the user device. In some embodiments, in step 2322 the server provides at least a portion of updated first floor plan information to the first user device corresponding to a first person in proximity to the first beacon transmitter. In some such embodiments, in step 2332 the server provides the escape route and/or other emergency information associated in storage with the first beacon transmitter to the first user device when the first beacon transmitter has been identified as the nearest beacon transmitter to the first user device.

Returning to step 2308, in step 2308, the server monitors for a signal from a device, e.g., a user device, of an emergency management person. Step 2308 is performed on an ongoing basis. Step 2308 may, and sometimes does, include step 2334 in which the server detects a signal being communicated from a device of an emergency management person. Operation proceeds from step 2324 to step 2326.

In step 2326 the server receives management level login information with proper authorization and authentication information from the device of the emergency management person. In some embodiments, in step 2326 the server receives a signal from a wireless device of an emergency management person responsible for emergency management, e.g., a signal identifying the emergency responder and/or providing authentication and/or authorization information required by the server to allow the emergency management person to update the maps and/or provide other emergency instructions via the server system. Operation proceeds from step 2336 to step 2338.

In step 2338 the server device communicates site map information for the site map at the emergency location to the device of the emergency management person. The communicated site map is, e.g., the stored site map including information identifying the location of the plurality of beacons at the site. Operation proceeds from step 2338 to step 2340.

In step 2340 the server communicates aggregated user observed information regarding the emergency to the device of the emergency management person, e.g., information obtained in step 2324 by iterations of step 2324 corresponding to one or more different user devices, which have detected beacon signals and communicated with the server. The emergency management person can process the aggregated information to obtain an overall view, e.g., corroborating reports, etc. The emergency management person can also decide which reported information should be communicated to user devices and which information should be withheld from the public, e.g., to avoid panic and to keep the situation under control. In some embodiments, in step 2340 the server provides to the wireless device of the first emergency management person said first user input along with input received from other users in proximity to beacons at a location where an emergency condition exits. Operation proceeds from step 2340 to step 2342.

In step 2342 the server communicates estimated location information and contact information, e.g., cell phone number(s), regarding user devices at the site. The cell phone numbers provides would allow the emergency management person to selectively content an individual of interest who happens to be situated at a location of interest from the perspective of the emergency management person coordinating the emergency response. In some embodiments, in step 2342 the server communicates location information to the wireless device of the first emergency management person indicating the location of device(s) which reported detection of beacon signals to the server. In some such embodiments, optionally, information including cell phone telephone number(s) of the person's or persons' device(s) who reported the information are further communicated to the first emergency management person to allow the first emergency management person, e.g., the emergency responder, to be able to call the individual telephone(s) which reported the beacon signal detection, e.g., to query the individual(s) and obtain specific information of interest.

Operation proceeds from step 2342 to step 2344, in which the server, receives from the emergency management person's device a set of information corresponding to a beacon transmitter, for each of a plurality of beacon transmitters, each set of information including at least one of a recommended escape route or a recommended emergency action to be taken by individuals in the proximity of the beacon transmitter. In some embodiments, in step 2344 the server receives first input from an emergency management person indicating a first recommended escape route or first emergency action to be taken by one or more individuals in proximity to a first beacon transmitter located at a first beacon location on the first floor plan. In some such embodiments, in step 2344 the server further received second input from said emergency management person indicating a second recommenced action to be taken by one or more individuals in proximity to a second beacon transmitter located at a second location on the first floor plan. In some embodiments, the first input indicates a first recommended escape route to be used to exit said structure by a person in proximity to the first beacon transmitter. In some such embodiments, the first input indicates a first escape rout and said second input indicates a second escape route different form said first escape route. In some other embodiments, the first input indicates a first escape route and the second input indicates an instruction on a location near the second beacon transmitter to be used as a hiding location. In some such embodiments, the second information further includes instructions for proceeding to the hiding location and/or for information ion how to secure the hiding location, e.g., how to lock or brace a door. Operation proceeds from step 2344, via connecting node A 2346, to step 2348.

In step 2348 the server receives threat information, e.g., the type of threat, the location of a fire, the location of an intruder, e.g., from the emergency management person's device. In various embodiments, the server updates the site map to include a symbol identifying the type of threat and the location of the threat. In some embodiments, the threat information communicated from the emergency management person is based on the emergency management person's evaluation of observed information from a plurality of user devices. In some embodiments, the in step 2348 the server receives threat location information, e.g., shooter or fire location information, from the wireless device of the emergency management person. In some such embodiments, the information may be based on the information reported by individuals at the scene which was provided to the emergency management person, e.g., responder, but is not posted to other users unless approved for posting by the emergency management person. Operation proceeds from step 2348 to step 2350.

In step 2350 the server receives instructions from the emergency management device. In some embodiments, in step 2350 the server receives different instruction to be provided to different users based on the user's proximity to a location of concern and rule information to be used to determine which instructions are to be supplied to a used based on proximity to a location of concern. In some such embodiments, the location of concern is an emergency management person indicated possible location of an intruder, e.g., a potential shooter. Operation proceeds from step 2350 to step 2352. In step 2352 the server receives rules regarding information distribution to user devices from the emergency management device. Operation proceeds from step 2352 to step 2354.

In step 2354 the server updates the site map based on the information received from the emergency management person's device. In some embodiments, in step 2354 the server updates the first floor plan information to include said first recommended escape route or first emergency action. In some such embodiments, in step 2354 the server updates the first floor plan information to include said second recommended escape route or second emergency action. Operation proceeds from step 2354 to step 2356.

In step 2356 the server generates, based on the information received from the emergency management device, management approved sets of information to be provided to users devices in proximity to a beacon transmitter, different sets of information corresponding to different beacon transmitters, each set of information including at least one of a recommended escape route or a recommended emergency action. Operation proceeds from step 2356 to step 2358.

In step 2358 the server stores the generated management approved set of information corresponding to different beacon transmitters. The stores sets are available, from which a particular set is selected, e.g., based on nearest beacon ID, and obtained in step 2330 to be provided to the user device in step 2332.

The methods and apparatus of the present invention are applicable to a wide range of communications systems which transmit signals, e.g., beacons signals including WiFi, Bluetooth, cellular and/or non-cellular systems.

In various embodiments nodes described herein are implemented using one or more modules to perform the steps corresponding to one or more methods of the present invention, for example, signal reception, signal processing, a determinations, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes and/or between beacon transmitters and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention Some embodiments are directed a non-transitory computer readable medium embodying a set of software instructions, e.g., computer executable instructions, for controlling a computer or other device to communicate information.

The techniques of various embodiments may be implemented using software, hardware and/or a combination of software and hardware. Various embodiments are directed to apparatus, e.g., a server such as an emergency management server. Various embodiments are also directed to methods, e.g., a method of providing emergency related information. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a server, a beacon transmitter, mobile nodes such as mobile terminals, non-management user devices, management person user devices, base stations, and a communications system which implement the present invention. It is also directed to methods, e.g., method of controlling and/or operating a server, a beacon transmitters, mobile nodes including user devices, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A method of providing emergency related information, the method comprising:
   receiving, at a server, signal information from a first user device indicating receipt of a first beacon signal from a first beacon transmitter;
   identifying, based on the signal information received from the first user device, the beacon transmitter nearest to the first user device; and
   operating the server to provide, to the first user device, escape route information associated in storage with a beacon transmitter identified as the beacon transmitter nearest to the first user device.

2. The method of claim 1, wherein the escape route information indicates an escape route leading from the location of the beacon transmitter identified as the beacon transmitter nearest to the first user device to an exit.

3. The method of claim 2, wherein the escape route information includes map information showing a map with the location of the beacon transmitter identified as the beacon transmitter nearest to the first user device and a path from the location of the beacon transmitter to the exit.

4. The method of claim 1, further comprising:
   receiving first user input from said first user, said first user input providing information observed from said first user; and
   providing to a wireless device of a first emergency management person said first user input along with input received from other users.

5. The method of claim 4, further comprising:
   operating the server to communicate location information to the wireless device of the first emergency management person indicating the location of user devices which reported detection of beacon signals to the server.

6. The method of claim 5, further comprising:
   receiving, at the server, threat location information from the wireless device of the first emergency management person.

7. The method of claim 6, further comprising:
   receiving at said server different instructions to be provided to different users based on the user's proximity to a location of concern and rule information to be used to determine which instructions are to be supplied to a user based on proximity to the location of concern.

8. The method of claim 7, wherein the location of concern is an emergency management person indicated possible location of an intruder.

9. A server comprising:
   a receiver configured to receive signal information from a first user device indicating receipt of a first beacon signal from a first beacon transmitter; and
   a processor configured to control the server to:
      identify, from the signal information received from the first user device, the beacon transmitter nearest to the first user device; and
      provide, to the first user device, escape route information associated in storage with the beacon transmitter identified as the beacon transmitter nearest to the first user device.

10. A computer program product for use in a computer, the computer program product comprising:
    a non-transitory computer readable medium comprising:
       code for causing said computer to receive signal information from a first user device indicating receipt of a first beacon signal;
       code for causing said computer to identify, from the signal information received from the first user device, the beacon transmitter nearest to the first user device; and
       code for causing said computer to provide, to the first user device, escape route information associated in storage with the beacon transmitter identified as the beacon transmitter nearest to the first user device.

11. The method of claim 1, wherein operating the server to provide, to the first user device, escape route information includes:
    operating the server to provide information indicating an escape route leading from the location of the beacon transmitter identified as the beacon transmitter nearest to the first user device to an exit.

12. The method of claim 11, wherein said information indicating an escape route includes a map showing the location of the beacon transmitter nearest to the first user device and a path to said exit.

13. The method of claim 1, further comprising:
    storing, in a storage device, escape route information associated with the first beacon transmitter.

14. The method of claim 13, further comprising:
    storing, in a storage device, hiding location information associated with the first beacon transmitter.

15. The method of claim 1, wherein the escape route information indicates an escape route leading from the location of beacon transmitter identified as the beacon transmitter nearest to the first user device to one of a plurality of exits.

16. The method of claim 15, further comprising:
storing information associating different escape routes with different beacon transmitters, said escape route leading from the location of beacon transmitter identified as the beacon transmitter nearest to the first user device being one of said different escape routes.

17. The method of claim 16, wherein the stored information includes a map showing the location of the multiple beacon transmitters and an escape route from the location of beacon transmitter identified as the beacon transmitter nearest to the first user device to said one of a plurality of exits.

18. The method of claim 1, wherein said first beacon transmitter is located on a vessel.

19. The server of claim 9, wherein said first beacon transmitter is located on a vessel.

20. The computer program product of claim 10, wherein said first beacon signal is from a first beacon transmitter located on a vessel.

\* \* \* \* \*